US 8,666,643 B2

(12) United States Patent
McBride et al.

(10) Patent No.: US 8,666,643 B2
(45) Date of Patent: Mar. 4, 2014

(54) SYSTEM AND METHOD FOR MODELING AND OPTIMIZING THE PERFORMANCE OF TRANSPORTATION NETWORKS

(75) Inventors: Kurtis McBride, Kitchener (CA); Tomas Benda, Waterloo (CA); David Thompson, Waterloo (CA)

(73) Assignee: Miovision Technologies Incorporated, Kitchener (CA)

( * ) Notice: Subject to any disclaimer, the term of this patent is extended or adjusted under 35 U.S.C. 154(b) by 498 days.

(21) Appl. No.: 13/019,120

(22) Filed: Feb. 1, 2011

(65) Prior Publication Data

US 2011/0191011 A1      Aug. 4, 2011

Related U.S. Application Data

(60) Provisional application No. 61/300,240, filed on Feb. 1, 2010.

(51) Int. Cl.
*G08G 1/04* (2006.01)
*G06F 19/00* (2011.01)

(52) U.S. Cl.
USPC .......................................... 701/117; 340/907

(58) Field of Classification Search
USPC ................... 701/117; 340/909, 907, 910, 920
See application file for complete search history.

(56) References Cited

U.S. PATENT DOCUMENTS

| | | |
|---|---|---|
| 3,414,876 A | 12/1968 | Cress, Jr. et al. |
| 4,167,785 A | 9/1979 | McReynolds et al. |
| 4,250,483 A | 2/1981 | Rubner |
| 4,257,029 A | 3/1981 | Stevens |
| 4,317,117 A | 2/1982 | Chasek |
| 4,322,801 A | 3/1982 | Williamson et al. |
| RE31,044 E | 9/1982 | McReynolds et al. |

(Continued)

FOREIGN PATENT DOCUMENTS

| | | |
|---|---|---|
| CN | 2459719 | 11/2001 |
| CN | 2657126 | 11/2004 |

(Continued)

OTHER PUBLICATIONS

Superstructures; The Economist Technology Quarterly; Dec. 2010; Online article Inside story: Superstructures | The Economist at http://www.economist.com/node/17647603/print.

(Continued)

*Primary Examiner* — Tan Q Nguyen
(74) *Attorney, Agent, or Firm* — Brett J. Slaney; Blake, Cassels & Graydon LLP

(57) ABSTRACT

A method and system are provided for modeling and optimizing the performance of transportation networks, e.g. for traffic signal retiming. The modeling and optimization may be implemented by obtaining a video signal from a camera at a first intersection; processing data from the video signal to determine at least one value indicative of a corresponding traffic flow through the first intersection; sending the at least one value to a remote processing entity via a wireless network to enable the remote processing entity to update a model of the transportation network, the transportation network comprising the first intersection and at least a second intersection; receiving from the remote processing entity, an instruction for a controller at the first intersection, the instruction having been determined from an update of the model based on data from at least the second intersection; and having the instruction implemented by the controller at the first intersection to optimize at least a portion of the transportation network.

31 Claims, 16 Drawing Sheets

(56) References Cited

U.S. PATENT DOCUMENTS

| | | | |
|---|---|---|---|
| 4,370,718 | A | 1/1983 | Chasek |
| 4,449,116 | A | 5/1984 | Hill et al. |
| 4,463,339 | A | 7/1984 | Frick et al. |
| 4,907,160 | A | 3/1990 | Duncan et al. |
| 5,182,555 | A | 1/1993 | Sumner |
| 5,257,194 | A | 10/1993 | Sakita |
| 5,357,436 | A | 10/1994 | Chiu |
| 5,416,711 | A | 5/1995 | Gran et al. |
| 5,444,442 | A | 8/1995 | Sadakata et al. |
| 5,465,289 | A | 11/1995 | Kennedy, Jr. |
| 5,668,717 | A | 9/1997 | Spall |
| 5,703,778 | A | 12/1997 | Takahashi et al. |
| 5,745,865 | A | 4/1998 | Rostoker et al. |
| 5,777,564 | A | 7/1998 | Jones |
| 5,778,332 | A | 7/1998 | Chang et al. |
| 5,822,712 | A | 10/1998 | Olsson |
| 5,917,432 | A | 6/1999 | Rathbone |
| 5,999,877 | A | 12/1999 | Takahashi et al. |
| 6,012,012 | A | 1/2000 | Fleck et al. |
| 6,133,854 | A | 10/2000 | Yee et al. |
| 6,170,955 | B1 | 1/2001 | Campbell et al. |
| 6,198,087 | B1 | 3/2001 | Boon |
| 6,317,058 | B1 | 11/2001 | Lemelson et al. |
| 6,366,219 | B1 | 4/2002 | Hoummady |
| 6,392,218 | B1 | 5/2002 | Kuehnle |
| 6,539,300 | B2 | 3/2003 | Myr |
| 6,577,946 | B2 | 6/2003 | Myr |
| 6,587,778 | B2 | 7/2003 | Stallard et al. |
| 6,617,981 | B2 | 9/2003 | Basinger |
| 6,734,904 | B1 | 5/2004 | Boon et al. |
| 6,909,380 | B2 | 6/2005 | Brooke |
| 6,930,593 | B2 | 8/2005 | Crawshaw |
| 6,989,766 | B2 | 1/2006 | Mese et al. |
| 7,557,731 | B2 | 7/2009 | Ramasubbu |
| 7,580,547 | B2 | 8/2009 | Behammou |
| 7,688,224 | B2 | 3/2010 | Teffer et al. |
| 8,050,854 | B1 | 11/2011 | Chandra et al. |
| 8,212,688 | B2* | 7/2012 | Morioka et al. ............ 340/920 |
| 8,253,592 | B1 | 8/2012 | Chandra et al. |
| 8,279,086 | B2* | 10/2012 | Liu et al. .................. 340/909 |
| 8,344,909 | B2* | 1/2013 | Teffer et al. ............... 340/910 |
| 2002/0116118 | A1 | 8/2002 | Stallard et al. |
| 2002/0186147 | A1* | 12/2002 | Basinger .................... 340/910 |
| 2003/0020633 | A1 | 1/2003 | Lee |
| 2005/0134478 | A1 | 6/2005 | Mese et al. |
| 2006/0095199 | A1 | 5/2006 | Lagassey |
| 2006/0142933 | A1 | 6/2006 | Feng |
| 2006/0181433 | A1 | 8/2006 | Wolterman |
| 2006/0197684 | A1 | 9/2006 | Tremblay |
| 2007/0273552 | A1* | 11/2007 | Tischer ...................... 340/910 |
| 2008/0094250 | A1 | 4/2008 | Myr |
| 2008/0150759 | A1 | 6/2008 | Ramasubbu |
| 2008/0204277 | A1 | 8/2008 | Sumner |
| 2008/0238720 | A1* | 10/2008 | Lee .......................... 340/909 |
| 2009/0322563 | A1 | 12/2009 | Stadtmiller et al. |

FOREIGN PATENT DOCUMENTS

| | | | |
|---|---|---|---|
| CN | 2660614 | | 12/2004 |
| CN | 1619551 | A | 5/2005 |
| CN | 1702699 | A | 11/2005 |
| CN | 1716334 | A | 1/2006 |
| CN | 1776768 | A | 5/2006 |
| CN | 2804986 | | 8/2006 |
| CN | 2891142 | | 4/2007 |
| CN | 2911832 | | 6/2007 |
| CN | 101042804 | A | 9/2007 |
| CN | 200990149 | | 12/2007 |
| CN | 201111730 | | 9/2008 |
| CN | 201156298 | | 11/2008 |
| CN | 201274095 | | 7/2009 |
| CN | 101635095 | A | 1/2010 |
| CN | 101706998 | A | 5/2010 |
| CN | 201498106 | | 6/2010 |
| CN | 101789183 | A | 7/2010 |
| FR | 1567980 | | 5/1969 |
| KR | 20010074042 | A | 8/2001 |
| KR | 20010074043 | A | 8/2001 |
| KR | 20010086637 | A | 9/2001 |
| KR | 20050006693 | A | 1/2005 |
| KR | 20060090837 | A | 8/2006 |
| KR | 20100108887 | A | 1/2010 |
| KR | 20100016889 | A | 2/2010 |
| LV | 13943 | B | 7/2009 |
| TW | 200601199 | A | 1/2006 |
| WO | WO 03/091966 | A1 | 11/2003 |
| WO | WO 2005/055524 | A1 | 6/2005 |
| WO | WO 2006/007415 | A2 | 1/2006 |

OTHER PUBLICATIONS

Fang, Clara et al.; Abstract of "Modeling and Simulation of Vehicle Projection Arrival discharge Process in Adaptive Traffic Signal Controls"; Journal of Advanced Transportation; 2010; pp. 176 to 192; vol. 44, Issue No. 3; ISSN: 0197-6729.

Lin, S. et al.; Abstract of "Estimating traffic flow by image processing and the usage of an adaptive traffic signal control system"; International Journal Of Its Research; 2009; pp. 78 to 88; vol. 7, Issue No. 2.

Tian, Ye. et al.; Abstract of "Design and Development of Agent-based Intelligent Traffic Signal Controller"; 2008; p. 7; ITS America, 100 17th Street, NW, Washington, DC, 20036, USA.

Yousef Khalil M. et al.; "Intelligent Traffic Light Flow Control System Using Wireless Sensors Networks"; Journal of Information Science and Engineering; 2010; pp. 753 to 768; vol. 26, Issue No. 3; ISSN: 1016-2364.

Hejun, Wu et al.; Abstract of "Design of intelligent traffic light control system based on traffic flow"; 2010; CCTAE 2010—2010 International Conference on Computer and Communication Technologies in Agriculture Engineering, Chengdu, China; Sep. 17, 2010; IEEE Computer Society; ISBN: 9781424469451.

Cai, Y. et al.; Abstract of "Measurement of vehicle queue length based on video processing in intelligent traffic signal control system"; 2010 International Conference on Measuring Technology and Mechatronics Automation, ICMTMA 2010, Changsha, China; Mar. 13 and 14, 2010; IEEE Computer Society; ISBN: 9780769539621.

Farooq, Umar; et al.; "Design and development of an image processing based adaptive traffic control system with GSM interface"; 2009 2nd International Conference on Machine Vision, ICMV 2009, Dubai, United Arab Emirates, Dec. 28 to 30, 2009; IEEE Computer Society; ISBN: 9780769539447.

Zhou, Binbin et al.; Abstract of "Adaptive Traffic Light Control in Wireless Sensor Network-based Intelligent Transportation System"; Proceedings of the 2010 IEEE 72nd Vehicular Technology Conference Fall, Sep. 6 to 9, 2010, Ottawa, Canada; IEEE; ISBN: 978-1-4244-3574-6.

Syed, Carmen; International Search Report from corresponding PCT Application No. PCT/CA2011/000106; search completed Jun. 4, 2011.

* cited by examiner

| Intersection ID | LPM ID | Flow ID | Value(s) | Flow ID | Value(s) | ... |

FIG. 6

| Intersection ID | LPM ID | Instruction | Time Window |

FIG. 7

SYSTEM AND METHOD FOR MODELING AND OPTIMIZING THE PERFORMANCE OF TRANSPORTATION NETWORKS

This application claims priority from U.S. Provisional Application No. 61/300,240 filed on Feb. 1, 2010, the contents of which are incorporated herein by reference.

TECHNICAL FIELD

The following relates generally to systems and methods for monitoring and controlling an area being observed and has particular utility in modeling and optimizing the performance of transportation networks.

BACKGROUND

Retiming traffic signals can be one of the most cost effective ways to improve traffic flow within a road network. Optimized traffic signals can reduce traffic delays and stops considerably as motorists travel along a section of road. The benefits of optimized traffic signals experienced by motorists include improved safety, reduced fuel consumption and reduced emissions.

Traffic data counts are typically conducted at intersections for three primary reasons. Firstly to determine the impact of a proposed physical redesign of an intersection, corridor or network (i.e. adding a new lane to an existing intersection). Secondly, to determine the impact of a proposed change to land usage along an intersection, corridor or network (i.e. changing an empty field into a condominium). Thirdly, to determine the impact of a proposed change to the signal phasing of an intersection, corridor or network (e.g. to give more green time to the North-South approach).

SUMMARY

In one aspect, there may be provided a method of modeling and optimizing a transportation network, the method comprising: receiving from a first processing module, via a wireless network, at least one value indicative of a corresponding traffic flow through a first intersection, the at least one value having been obtained by processing data from a video signal from a camera at the first intersection; using the at least one value to update a model of the transportation network, the transportation network comprising the first intersection and at least a second intersection; analyzing the model to determine an instruction for optimizing a controller at the second intersection; and sending the instruction to a second processing module at the second intersection via the wireless network, to enable the second processing module to have the instruction implemented by the controller at the second intersection to optimize at least a portion of the transportation network.

In another aspect, there may be provided a method of modeling and optimizing a transportation network, the method comprising: obtaining a video signal from a camera at a first intersection; processing data from the video signal to determine at least one value indicative of a corresponding traffic flow through the first intersection; sending the at least one value to a remote processing entity via a wireless network to enable the remote processing entity to update a model of the transportation network, the transportation network comprising the first intersection and at least a second intersection; receiving from the remote processing entity, an instruction for a controller at the first intersection, the instruction having been determined from an update of the model based on data from at least the second intersection; and having the instruction implemented by the controller at the first intersection to optimize at least a portion of the transportation network.

In yet another aspect, there may be provided a method of modeling and optimizing a transportation network, the method comprising: receiving an instruction from a remote processing entity via a wireless network, the instruction for having a controller optimize at least a portion of the transportation network at a first intersection, the instruction having been determined by the remote processing entity analyzing a model of the transportation network comprising the first intersection, the model having been updated by data obtained at one or more additional intersections in the transportation network; and sending the instruction to a communications interface coupled to the traffic signal controller.

There may also be provided computer readable storage medium comprising computer executable instructions for performing the above methods. There may also be provided devices or systems comprising respective processors and memory comprising computer executable instructions for performing the above methods.

BRIEF DESCRIPTION OF THE DRAWINGS

Embodiments will now be described by way of example only with reference to the appended drawings wherein:

FIG. 6 is a schematic diagram of an example data packet for providing traffic flow information.

FIG. 7 is a schematic diagram of an example data packet for providing a traffic timing instruction.

DETAILED DESCRIPTION OF THE DRAWINGS

It has been recognized that many traffic signals are not retimed because it is inconvenient and costly to do as a result of the many manual processes required. The solution described herein automates the manual processes and proposes a more convenient and cost effective solution to current methods being employed.

It has also been recognized that the underlying framework discussed herein can be used to both monitor and control aspects of any "observed area", e.g. a traffic intersection or other physical environment. As such, the solution described herein can not only aid in automating traffic signal retiming, but also in more generally modeling and optimizing the performance of transportation networks. For example, a traffic intersection can be monitored not only using a camera but also other sensors (e.g. wireless vibration sensors, strain sensors, microphones, thermistor, moisture sensors, lidar, radar, ground loops, etc.) to obtain data and by communicating such data from a local processing module to a remote processing site, various aspects of the intersection can be determined and controlled and the data mined for further analyses. Data acquired from the sensors can also augment the data obtained from a video signal to enable more comprehensive optimizations to be conducted. For example, sensing historical origin-direction (OD) data of vehicles passing through an intersection can aid in determining how to retime a particular traffic light at other intersections in the traffic network.

The implementation of an adaptive traffic signal control system as described herein, can be based on a single camera, a single processing unit located at the intersection, and a serial dongle (e.g. to provide a communication interface). This solution is significantly lower cost than traditional induction loops, leverages existing broadband wireless networks to minimize network installation costs, and uses economies of scale of a cluster of computing resources to minimize the need for expensive controller hardware at the intersection.

The framework described below can be utilized to provide a monthly subscription based service to a municipality or other entity without the large capital costs upfront since the hardware installation process is easier and more cost effective and the cluster computing resources provide economies of scale to service multiple customers. All of these benefits represent a significant cost savings and thus ability to more easily upgrade a traffic system to utilize adaptive signal control.

Figure 1:
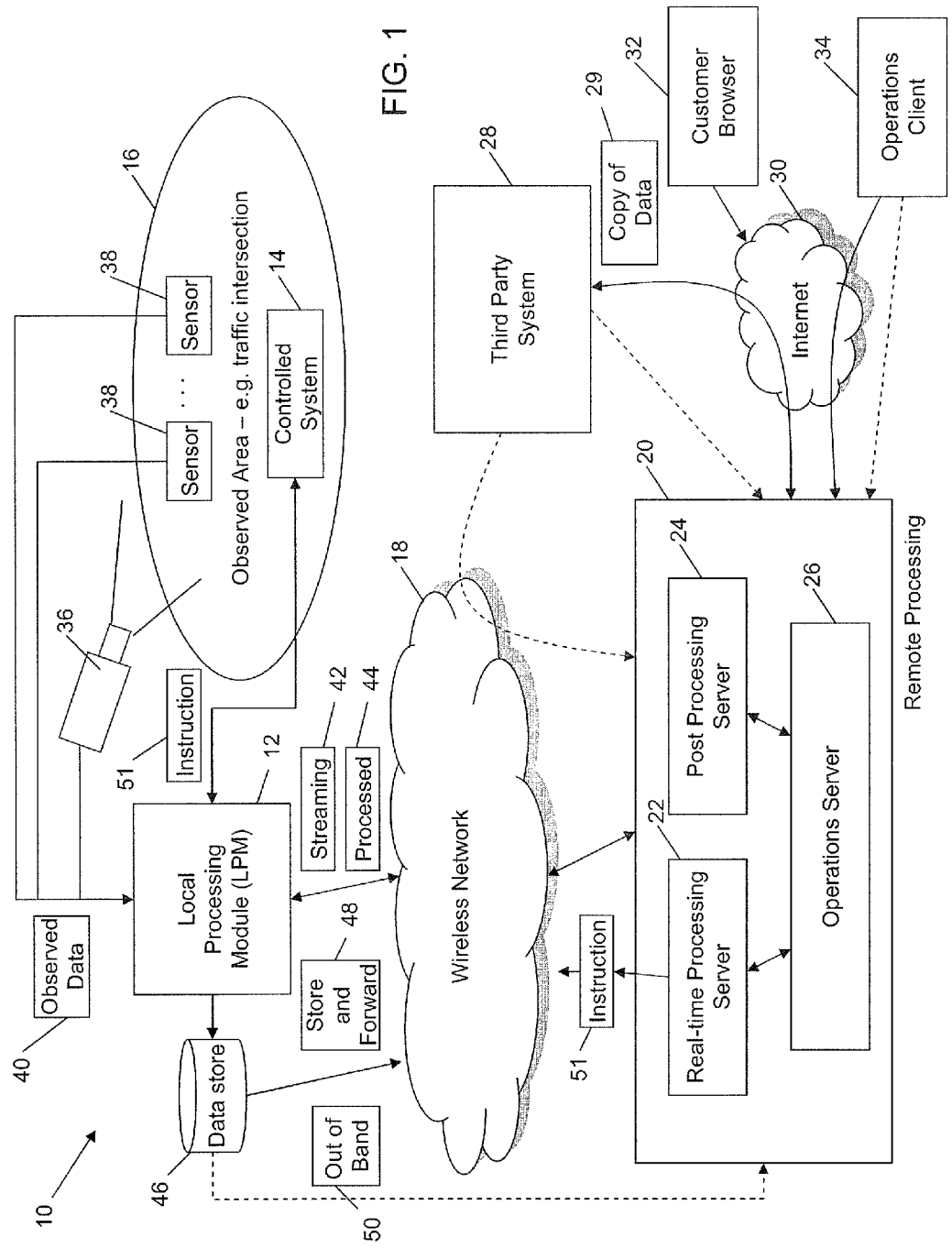
FIG. 1 is a block diagram of an example system for monitoring and controlling an observed area.

Turning now to the figures, FIG. 1 illustrates an example system for monitoring and controlling an observed area, hereinafter referred to as the "system 10" for brevity. The system 10 includes a local processing module (LPM) 12 which is communicably connectable to a controlled system 14 that resides in an observed area 16. The LPM 12 may be in the vicinity of the observed area 16, directly within the observed area 16, or otherwise within a communicable range of the observed area 16. The LPM 12 is operable to collect or otherwise obtain data from or about the observed area 16, process that data if applicable, and communicate via a wireless network 18 with a remote processing entity 20 to provide the data itself or a processed version thereof for either real-time processing or post-processing as will be explained in greater detail below. As will be discussed below, it has been found that communicating via an existing wireless network 18 such as a cellular network (e.g. GSM/GPRS networks, 3G or 4G networks such as EDGE, UMTS and HSDPA, LTE, Wi-Max; etc.) is particularly advantageous in implementing the system 10 described herein due to inherent coverage and ubiquity and thus ability to effectively connect one or more observed areas 16 to the remote processing entity 20 for operating as discussed below.

In the example shown in FIG. 1, the LPM 12 obtains data from a camera 36 (e.g. a video signal) as well as any one or more sensors 38 that are capable of observing and capturing data pertaining to the observed area 16. Collectively, the data that is obtained from or about the observed area 16 may be referred to as observed data 40 hereinafter. The observed data 40 that is processed is sent to the remote processing entity 20 according to a particular protocol, e.g. User Datagram Protocol (UDP), such that one or more messages or packets are sent that include relevant information or data obtained from an analysis of the applicable observed data 40 (e.g. traffic flow determined from a video signal). The observed data 40 or portions thereof may also be sent directly to the remote processing entity 20 as streaming data 42, at a later time by first storing the data in a data store 46 and sending it later (shown as store and forward data 48), or by storing the data in the data store 46 and making it available out-of-band 50, e.g. using a physical medium such as a USB dongle, removable flash drive, etc. It can therefore be appreciated that the LPM 12 can be operated to deliver the observed data 40 or a processed version thereof using various channels and using various protocols and techniques. For example, unprocessed streaming data 42 could be provided to the remote processing entity 20 for subsequent processing whereas the same data after being processed can be used to perform a real-time analysis of the current conditions of the observed area 16 (and other observed areas 16 in a network of observed areas 16 as discussed below), in order to return an instruction 51 to the LPM 12 for controlling or otherwise influencing the control of the controlled system 14. The controlled system 14 may also communicate data back to the LPM 12, e.g. for reporting its actual behaviour, obtaining status information (such as whether or not a command has been executed), heartbeat/ping (i.e. whether or not controlled system 14 is communicating), etc.

The remote processing entity 20 is also communicable via the wireless network 18 in order to obtain the streaming 42, processed 44, and store and forward data 48 from one or more LPMs 12. In this example, the remote processing entity 20 includes both a real-time processing server 22 for processing data as it arrives and, with minimal latency, determine and provide an appropriate instruction 51 to be returned to one or more of the LPMs 12 (e.g. by receiving data from one LPM 12 and providing an instruction 51 to one or more other LPMs 12 to pre-emptively control other observed areas 16). The remote processing entity 20 may also include a post-processing server 24 to enable data to be mined in subsequent analyses, i.e. by analyzing the data when a result of the analysis is not required in real-time. An operations server 26 is also included to enable an administrator to have access to a central repository of operational data, to control and/or update the servers 22, 24, to initiate upgrades to the system 10 (including remotely upgrading LPMs 12), etc.

In this example, an operations client 34 is provided, which may run on a personal computer (e.g. mobile computer, desktop computer, etc.) to allow operations personnel to access the operational data stored on the operations server 26 via the Internet 30 or through another available interface or connection. The operations client 34 can also be used to obtain reports on the status of the system 10. A customer browser 32 may also access the remote processing entity 20 via the Internet 30 to allow a customer (i.e. an entity which has an interest in any one or more of the observed data 40 itself, the processed data 44, or data obtained through post-processing) to monitor and adjust parameters of an associated observed area 16 or network of observed areas 16.

Both the real-time processing server 22 and the post-processing server 24 may incorporate third party data (e.g. transit system information) into their analyses. In order to obtain such third party data, a third party system 28 may be communicatively connectable to the remote processing entity 20, e.g. via the wireless network 18, the Internet 30, or through another connection as illustrated in FIG. 1.

The third party system 28 shown in FIG. 1 may also represent an entity that obtains a copy of data 29 from the remote processing entity 20, e.g. for data mining or other purposes. For example, the video obtained by the cameras 36 may be streamed, stored and forwarded, or otherwise provided to a third party system 28 for subsequent processing, such as for integrating the video feeds into a network of security cameras or traffic cameras, or provides video for policing, insurance companies, television stations, etc. Similarly, the observed data 40 may be used to generate a model of a particular network such as a grid of roadways, intersections and traffic flow thereon (as discussed more fully below). Any such model can also be provided to a third party system 28 in order to update consumer-directed online map programs, GPS devices, or any other application or device that may rely on traffic flow data for providing ongoing information to the consumer. The observed data 40 obtained by the sensors 38 may also be made available to a third party system 38 for continual monitoring or subsequent data mining. Data mining can also be performed by the post processing server 24 and the results provided to third party systems 28. For example, observed traffic flow and various other criteria can be obtained to determine the environmental impact achieved (i.e. reduction in vehicle green house gas emissions) by improving signal re-timing or other optimization techniques to obtain carbon credits or otherwise track such environmental statistics for later use.

It can be appreciated that although the configuration shown in FIG. 1 illustrates having the copy of data 29 sent to the third party system 28 via the remote processing entity 20, in other example embodiments at least some of the observed data 40 could be sent to the third party system 28 directly from the LPM 12. However, by routing the data through the remote processing system 20, the operations server 26 can track data that is being sent in order to provide subscription based services to the third party systems 28 thus offloading such administrative burden from the LPM 12.

Figure 2:
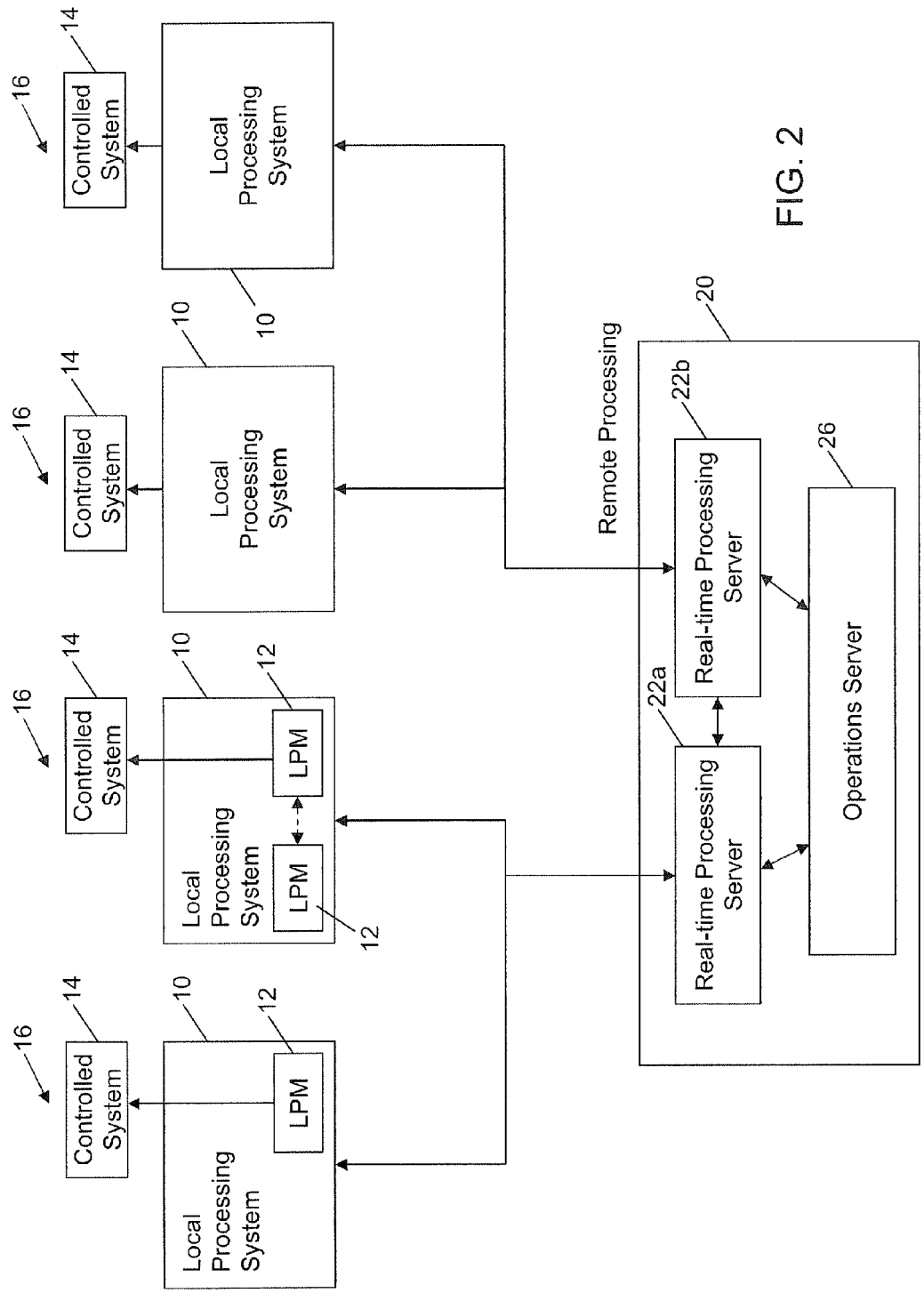
FIG. 2 is a block diagram of an example system for monitoring and controlling a network of multiple observed areas.

FIG. 1 illustrates one LPM 12 and one corresponding observed area 16, however, it can be appreciated that, as shown in FIG. 2, a plurality of observed areas 16 in various configurations can be monitored and controlled by the remote processing entity 20, including networks of observed areas 16 such as a network of traffic intersections. Turning now to FIG. 2, it can be seen that the remote processing entity 20 may utilize a plurality of real-time processing servers 22, each being associated with one or more observed areas 16. For example, a plurality of real-time processing servers 22 can be associated with corresponding traffic "grids" or sub-networks or network portions, the plurality of grids together defining a traffic network that is being monitored and controlled. It may be noted that not every intersection in a traffic network may include an LPM 12 even though its contribution to traffic flow is being modeled by the LPM 12. As such, it can be appreciated any number of LPMs 12 may be utilized with a traffic network having any number of intersections or portions, and need not have a one-to-one relationship. In some embodiments, if the physical environment permits, a single LPM 12 may be configured to obtain video signals from multiple cameras 36, even at multiple intersections and similarly control multiple controlled systems 14 from the same location. Therefore, it may also be appreciated that various configurations can be utilized depending on the physical configuration and the requirements of the particular application. One illustrative example is shown in FIG. 2 to demonstrate such flexibility.

In the example shown in FIG. 2, a first real-time processing server 22a is responsible for a pair of local processing systems 10, one for each observed area 16 and corresponding controlled system 14. As shown in FIG. 2, multiple LPMs 12 may be included in or otherwise operated by a system 10, e.g. when multiple cameras 36 are used at the same intersection. In such a scenario, one of the LPMs 12 can be made responsible for providing instructions 51 to the controlled system 14 (and thus may be coupled thereto) whereas other LPMs 12 in that system 10 can be configured to communicate data to the LPM 12 connectable to the controlled system 14. It can be appreciated that in other embodiments, each LPM 12 can be connectable to both the remote processing entity 20 and one or more controlled system 14 and the remote processing entity 20 can be responsible for determining to which of the LPMs 12 the instruction should be sent. This can also provide redundancy to a particular system 10, e.g. to accommodate failure of one LPM 12.

A second real-time processing server 22b similarly monitors and controls a plurality of local processing systems 10 in this example and further details need not be repeated. It can also be seen in FIG. 2 that the real-time processing servers 22a and 22b can communicate with each other such that a result of a real-time analysis in one of the servers 22 can be used to control operation of a controlled system 14 whose responsibility falls under another of the servers 22. In this way, for example, traffic flow at one intersection can be used to control traffic signal timing in one or more other intersections, whether such intersections are controlled by the same real-time processing server 22 or another processing server 22.

Figure 3:
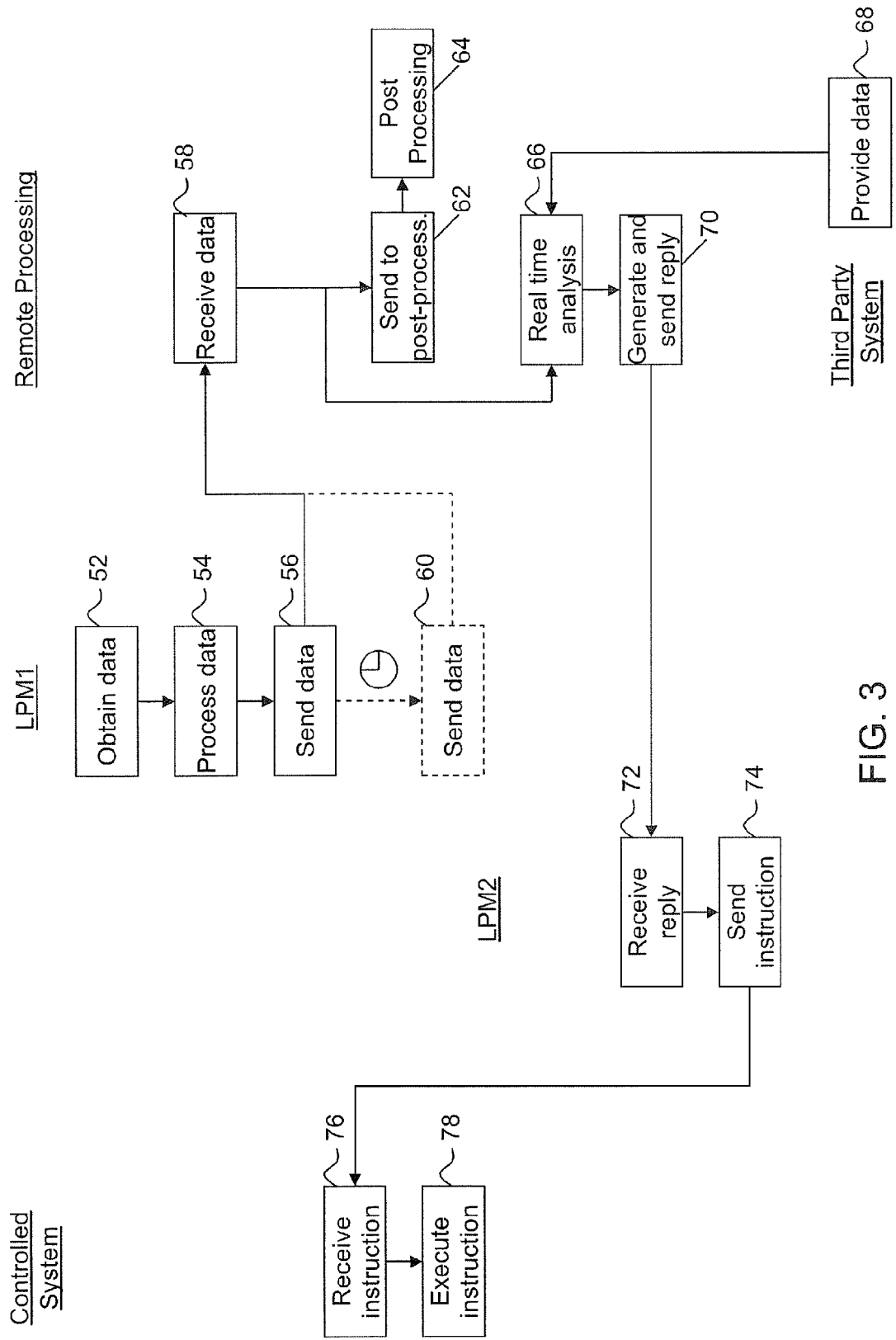
FIG. 3 is a flow diagram illustrating an example set of operations that may be executed in monitoring and controlling an observed area.

FIG. 3 illustrates an example set of operations that may be performed in monitoring and controlling an observed area 16. At 52, a first LPM 12, namely LPM1, obtains observed data 40, e.g. a video signal and, if applicable, data from one or more sensors 38. At 54, LPM1 processes the observed data 40. As discussed above, this may include storing data for later delivery (e.g. out-of-band 50 or store and forward 48), streaming 42 the data or a portion thereof directly to the remote processing entity 20 (e.g. video streaming), or having one or more analytics routines applied to the data before a result, such as processed data 44, is sent to the remote processing entity 20. As shown in FIG. 3, in this example, data, which is either processed 44 or streaming 42 or both, is sent to the remote processing entity 20 at 56 and optionally provided at a subsequent time at 60 (e.g. if stored and forwarded later).

The remote processing entity 20 then receives the data at 58. In this example, data which is to be subsequently or otherwise separately processed by the post-processing server 24 is sent thereto at 62 so that one or more post processing routines may be performed at 64. For example, video or other multimedia data may be provided to the post processing server 24 to analyze the video content for predetermined or provided parameters to offload processing from LPM1. Such an example is more fully described in co-pending U.S. patent application Ser. No. 12/104,092 filed on Apr. 25, 2007 and entitled "Method and System for Analyzing Multimedia Content", the entire contents of which are incorporated herein by reference.

The remote processing entity 20 also provides applicable data, i.e. data which has been at least partially processed by LPM1, to the real-time processing server 22 in order to have one or more real-time analyses conducted at 66. Such real-time analyses may incorporate data provided at 68 by a third party system 28, e.g. transit scheduling in a traffic model analysis.

As discussed above, the real-time analysis may produce an instruction 51, typically to be provided to another LPM 12, namely LPM2 in this example, for controlling its controlled system 14 and thus a corresponding observed area 16 (e.g. a set of traffic lights) based on a determination made in the observed area 16 associated with LPM1. For example, traffic flow observed by LPM1 can be used to determine a modification to traffic signal timing at the intersection observed and controlled by LPM2. In the example shown in FIG. 3, a reply, e.g. a data packet comprising an instruction 51, is generated and sent at 70 and received by LPM2 at 72. LPM2 may then determine the instruction 51 from the reply and send the instruction 51 to the controlled system 14 in its observed area 16 at 74, which is received by the controlled system 14 at 76. For example, LPM2 may send a traffic signal timing instruction to a traffic signal controller (TSC) 114 (see FIG. 5) via another component coupled thereto, further details of which are provided below. The instruction 51 received at 76 may then be executed at 78 thus monitoring data obtained by LPM1 to control an observed area 16 controlled by LPM2. It can be appreciated that by communicating via the remote processing entity 20 not only can at least some processing be offloaded from the LPM 12, and thus reduce processing burden at the LPMs 12, a larger network of observed areas 16 can be modeled and optimized and subsequently controlled using the framework shown in FIG. 1. As such, only two LPMs 12 are shown in FIG. 3 for ease of illustration and many additional LPMs 12 may also be instructed by the remote processing entity 20 as a result of a particular real-time analysis at 66. Similarly, LPM1 may also be instructed based on data obtained from other LPMs 12 in a network of LPMs 12.

It has also been realized that the framework shown in FIG. 1 is particularly suitable to enable the remote processing entity 20 to centrally control and distribute not only instructions for optimizing the operation of a network of controlled systems 14, but also for upgrading firmware on the LPMs 12, thus avoiding the need to visit each site in order to do so. For relatively large and geographically spaced observed areas 16 in a particular network, the ability to remotely upgrade and modify firmware or any other controllable component of the LPM 12 is particularly efficient and thus cost effective. By allowing customers to access the operations server 26, e.g. via a security controlled access via the customer browser 32, the customer can initiate or authorize upgrades that are suggested by the remote processing entity 20. For example, new regulations may impose restrictions on the way a network of traffic lights can be controlled and the customer would be able to communicate with the remote processing entity 20 using the customer browser 32 to establish a suitable upgrade to account for these restrictions.

Figure 4:
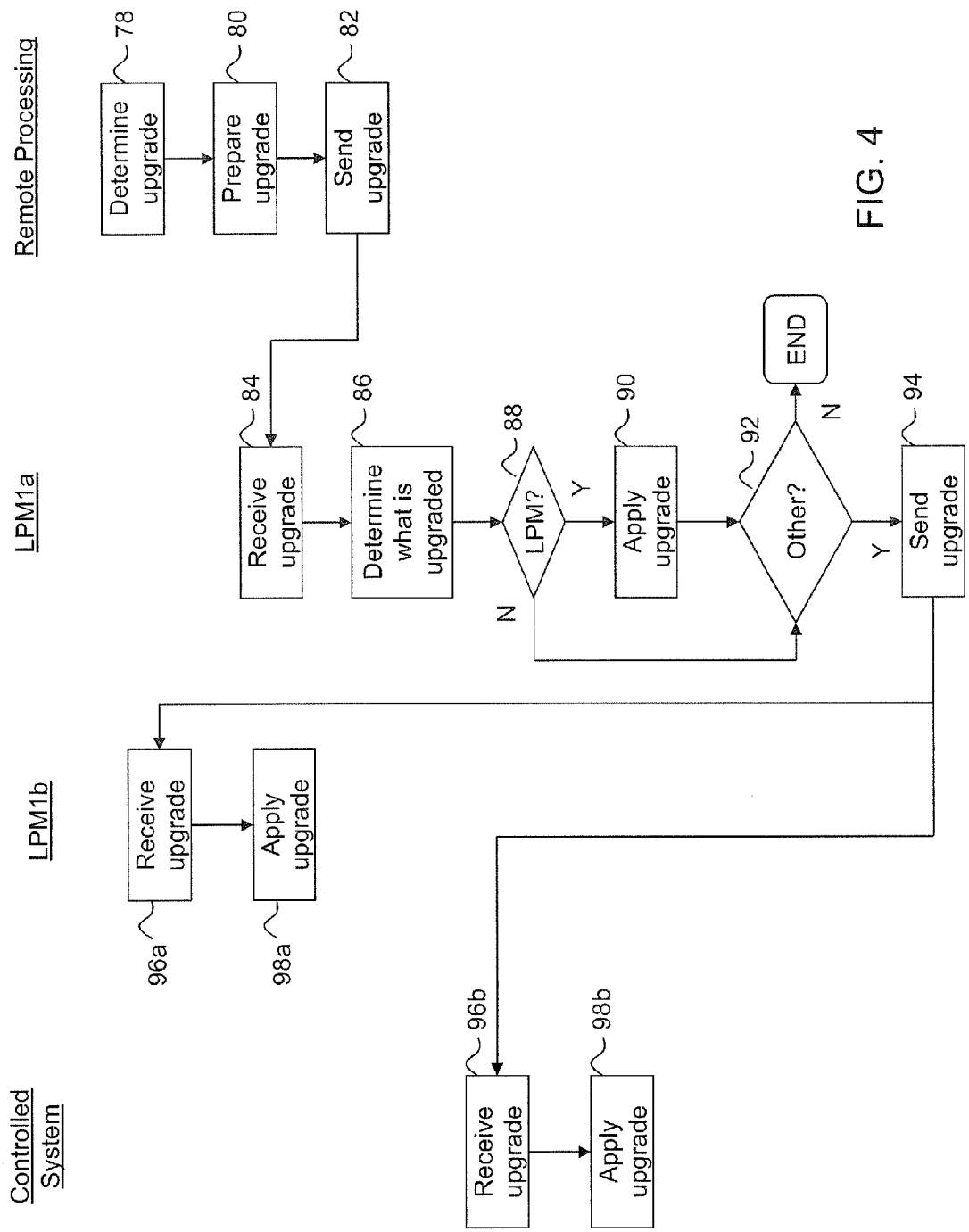
FIG. 4 is a flow diagram illustrating an example set of operations that may be executed in upgrading the example systems of FIGS. 1 and 2.

FIG. 4 illustrates an example set of operations that may be performed in upgrading any one or more of a first LPM 12 (LPM1a), a second LPM 12 (LPM1b), and a controlled system 14, from the remote processing entity 20, e.g. under the control of the operations server 26. At 78, an upgrade is determined by the remote processing entity 20, e.g. via a request made by operations personnel via the operations client 34. The upgrade may be loaded from an external source (e.g. upgrade executable file loaded via the operations client 34), may be generated on the operations server 26, or may comprise a set of instructions to have LPM1a and/or LPM1b and/or a controlled system 14 upgrade themselves (e.g. small modification to an existing parameter or setting). The upgrade is prepared at 80 and sent to LPM1a at 82, in this example, whether or not LPM1a itself is being upgraded or a controlled system 14 or LPM1b connectable thereto is being upgraded. The upgrade is received by LPM1a at 84 and LPM1a in this example determines what is being upgraded, e.g. itself, LPM 1b in the same system 10, or a controlled system 14. This may be done by examining a header or other portion of a data packet or series of data packets carrying the upgrade. LPM1a determines at 88 whether or not it will be upgrading itself. If so, the upgrade is applied at 90. If LPM1a is not to be upgraded or, in addition to upgrading itself, LPM1a determines at 92 if other devices are to be upgraded, i.e. either LPM1b, the controlled system 14, or both. If not, the process ends. If another device is to be upgraded, the upgrade is sent at 94 and received at 96a and/or 96b. The upgrades are then applied at the other devices at 98a and 98b respectively. It can be appreciated that the provision of an upgrade from LPM1a to LPM1b and the controlled system 14 are for illustrative purposes only and may require a permission and ability to do so. For example, some existing controlled systems 14 may not allow upgrades to be initiated by third party systems such as the LPM 12 and thus operations 96b and 98b would not be possible in such circumstances.

Figure 5:
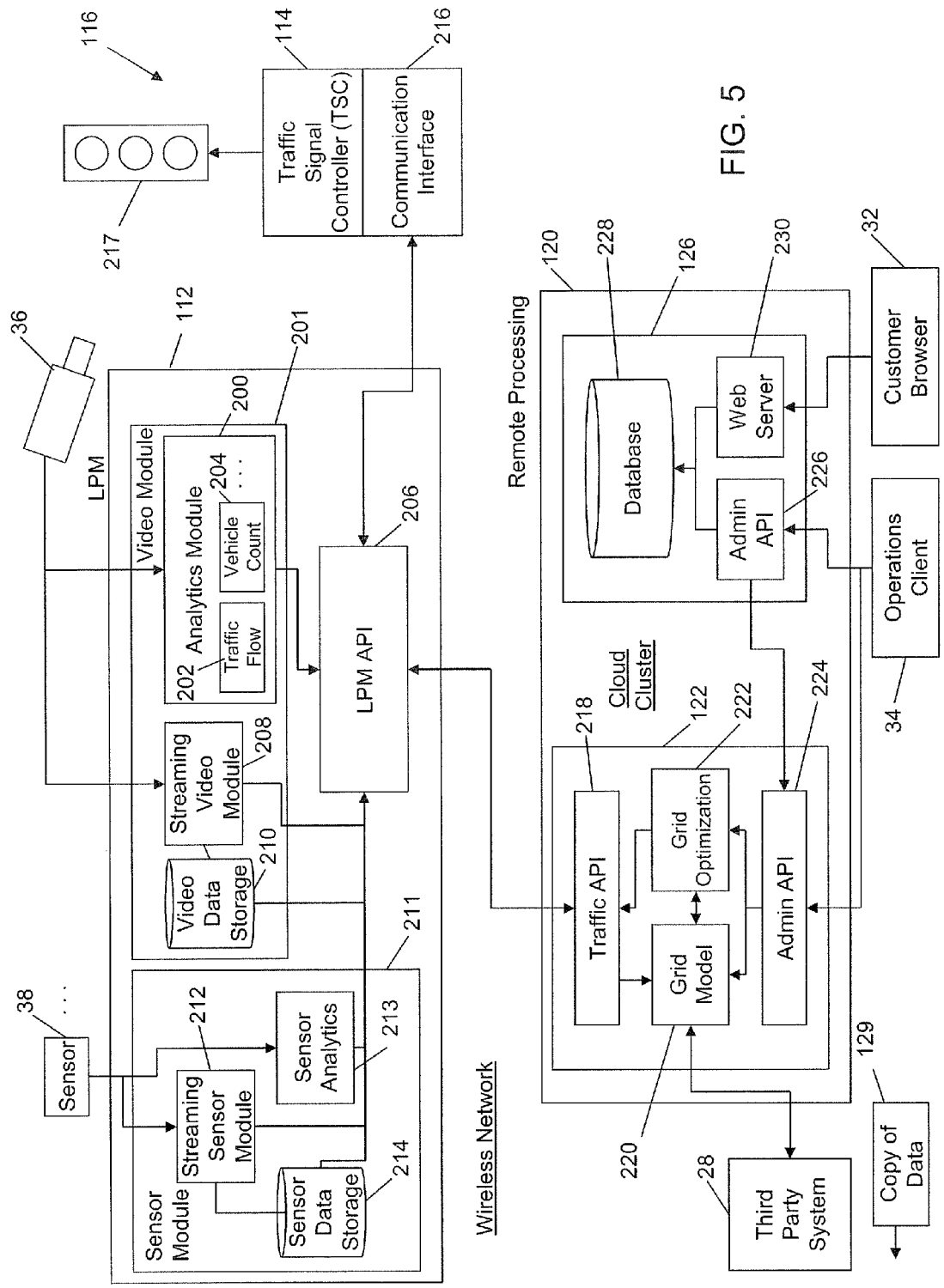
FIG. 5 is a block diagram of an example system for monitoring an intersection and controlling traffic signal timing in that intersection.

FIG. 5 illustrates further detail of an example configuration of the system 10 and remote processing entity 20 shown in FIG. 1 suitable for optimizing traffic signal timing, wherein similar elements are given common reference numerals with the pre-fix "1" for clarity in FIG. 5 and identical elements are given identical reference numerals in FIG. 5. The example shown in FIG. 5 illustrates one LPM 112 and corresponding observed area 116 for ease of explanation. It will be appreciated that a number of LPMs 112 and observed areas 116 may be monitored and controlled in a manner similar to what is shown in FIG. 2. The LPM 112 may be embodied as a hardware device housed in a box or other enclosure and mounted at the intersection 116, e.g. on a pole. Physical security measures can be added, for example a lock or other tamper-resistant mechanism. The LPM 112 in this example includes a video module 201 for handling data received from the camera 36, i.e. a video signal or feed. The video module 201 includes an analytics module 200 operable to apply one or more analytics algorithms to observed data 40 such as a video signal as illustrated in FIG. 5. The video module 201, analytics module 200 and other components in the LPM 112, may be implemented on a printed circuit board (PCB) that executes communication firmware as well as the analytics algorithms, etc. It can be appreciated that the physical components used to create the LPM 112 should be temperature rated to withstand the environment in which it is located.

In this example, the analytics module 200 includes a traffic flow algorithm 202 for performing a real-time analysis of traffic flow as determined from a video signal fed to the LPM 12 from the camera 36. FIG. 5 also shows a vehicle count algorithm 204, which may be used to perform pre-processing for a post-processing routine performed by a post-processing server 24 (not shown in FIG. 5). The outputs of the analytics module 200 are provided to an LPM application programming interface (API) 206, which communicates with the remote processing entity 120 substantially in real-time, e.g. by accessing a communication sub-system (not shown) configured to access and communicate over the wireless network 18.

The traffic flow algorithm 202 in this example embodiment represents or otherwise includes computer executable instructions, i.e. software, that is capable of transforming a video signal into one or more numeric values that correlate with one or more traffic flows observed in the video signal. It can be appreciated that a plurality of traffic flow algorithms 202 may be utilized to obtain multiple independent numeric values which correspond to the same traffic flow in order to better predict the actual flow at any given time. Similarly, different traffic flow algorithms 202 may be required to determine multiple traffic flows in the same intersection (e.g. in different directions). As such, the "traffic flow algorithm 202" shown in FIG. 5 may represent any one or more traffic flow algorithms 202. The traffic flow algorithm(s) 202 should run in real-time or substantially in real-time in order to process the video signal as soon as it can be captured from the camera 36. The traffic flow algorithm(s) 202 in this example is/are executed on an embedded electronics platform, e.g. the PCB as mentioned above.

The video module 201 also includes a streaming video module 208 operable for streaming the video signal received from the camera 36 to the remote processing entity 120 without performing any analytics at the LPM 112, and a video data storage 210 for storing video content, e.g. a video file comprising a particular number of minutes or hours of video, for later transmission or out-of-band delivery as discussed above.

To handle or otherwise process data obtained by the sensors 38, a sensor module 211 can also be included in the LPM 112. Similar to the video module 201, the sensor module 211 includes a sensor analytics module 213 to enable analytics algorithms to be applied to sensor data before it is sent to the remote processing entity 120. The sensor module 211 in this example also includes a streaming sensor module 212 to enable sensor data to be streamed to the remote processing entity 120 and a sensor data storage 214 to enable sensor data to be stored for later transmission or to be provided for out-of-band delivery.

The LPM API 206 represents or otherwise includes computer executable instructions, i.e. software, that controls the operation of the LPM 112. The LPM API 206 can securely communicate with the remote processing entity 120 via an internet protocol (IP) connection such as a broadband cellular modem or Ethernet connection, and is capable of performing firmware upgrades of all software in or controlled by the LPM 112 as noted above. The LPM API 206 should also be capable of communicating with a communication interface 216 closely coupled to the TSC 114 as will be discussed in greater detail below. In some embodiments wherein the LPM 112 and communication interface 216 are physically separated, the LPM API 206 may be configured for participating in short-range wireless communication exchanges such as over Bluetooth, Zigbee, WiFi, etc. capable of running continuously at or near the observed area 116. By communicating with the sensor model 211 and video module 201, the LPM API 206 can continuously or periodically record and store any particular number of hours of video data and/or sensor data, and execute an on-demand or periodic delivery of stored data to the remote processing entity 120. The LPM API 206 may therefore be configured to obtain video files and sensor data from the video data storage 210 and sensor data storage 214 respectively in order to provide unprocessed data (i.e. data that has not been processed by the analytics module 200) to the remote processing entity 120, e.g. for subsequent data mining, periodic post-processing, etc. as well as being able to direct analyzed data to the remote processing entity 120.

The LPM API 206 is also operable in this example embodiment to communicate with the streaming video module 208 and/or sensor streaming module 212 (or itself contain the streaming video module 208 and/or sensor streaming module 212, or execute equivalent operations) to provide continuous, periodic or on-demand streaming of live video and/or sensor data obtained by the camera 36 and/or sensors 38. The camera 36 itself should be weather rated and capable of capturing a high quality video signal with a multi-year operational capability (i.e. suitable longevity). The sensors 38 similarly should be weather rated and capable for long-term use. The streaming video module 208 (shown separately from the LPM API 206 for ease of explanation) is provided to capture the camera's video signal for streaming data directly to the remote processing entity 120 if applicable, or to store the raw video signal as a video file in a video data storage 210. The sensor module 211 may also be used to obtain data captured by the sensors 38 and to store such data in a sensor data storage 214.

The LPM API 206 is also communicatively connectable to the communication interface 216 coupled to the TSC 114. The communication interface 216 may also be referred to generally as a signal controller interface device. In this example, the LPM API 206 utilizes a short-range communications protocol as noted above, in order to pass along instructions 51 received from the remote processing entity 120. The TSC 114 is therefore capable of being modified or otherwise instructed by the communication interface 216 in order to enable the remote processing entity 120 and the LPM 112 to control its operation. In this example, the TSC 114 is operable to control the timing of traffic lights 217 at an intersection, i.e. the observed area 116 in this example. The TSC 114 is typically housed in a mechanical enclosure or "traffic cabinet", with one TSC 114 typically being located at each intersection. The communication interface 216 is typically a hardware device that resides in the traffic cabinet to provide a secure wireless interface to the TSC's communication port (not shown). The communication interface 216 may comprise a PCB that executes communication firmware and which should be temperature rated to accommodate ambient weather conditions.

The remote processing entity 120 in this example takes advantage of cloud computing, e.g. by utilizing a cluster of computing resources that are location independent of the LPM 112. The use of cloud computing or "server farms" enables the remote processing entity 120 to be scalable to accommodate ever increasing LPMs 112 in a particular network as well as new networks (with their constituent LPMs 112) come online. The LPM 112 shown in FIG. 5 is controlled in this example by a particular real-time processing server 122, which is responsible for monitoring and controlling one or more LPMs 112 associated with one or more intersections 116. The real-time processing server 122 comprises a traffic API 218 for handling incoming data from the LPM API 206 and for returning instructions 51 thereto.

The traffic API is in this example is responsible for applying cryptographic and other security related measures such as encryption, decryption, authentication, etc., as well as any data compression/decompression and data translation techniques. The communication protocols and layers should be highly optimized for low latency and should be scalable to accommodate additional in-field installations. The traffic API 218 can also be used to log incoming and outgoing messages pertaining to traffic flows and signal adjustments for further off-line analyses.

The traffic API 218 is also used to direct incoming data into a grid model 220. The grid model 220 is a model of a grid or network of grids (e.g. mathematical, visual, or both), each grid comprising one or more intersections 116, and is updated in real-time as the data arrives from the typically multiple LPMs 112 in the grid. As shown in FIG. 5, the grid model 220 may be updated using data provided by a third party system 28, e.g. to incorporate transit routes, schedules, updates about delays, etc., into the model being optimized. The data from the grid model 220, e.g. snapshots thereof, may also be provided to third party systems 28, e.g. to provide traffic data for new stations, online mapping programs, etc.

As the grid model 220 is updated, a grid optimization module 222 is used to obtain snapshots of the grid model 220 in order to analyze the most recent snapshot for optimizing the grid or the overall network of grids. It can be appreciated that by taking frequent snapshots of the grid model 220, predictive optimizations can be performed in order to re-time the network in substantially real-time without having to account for continual changes occurring to the model while the optimization routine is being performed. A snapshot of the grid model 220 in this example refers to a representation of a current state of the grid model 220 at a particular instance of time.

A number of different types of adaptive signal control optimization methods exist. The three main types of optimization methods are:

Domain-constrained optimization: where an optimization search domain is very much limited to avoid high fluctuations of signal timings (e.g. Split Cycle and Offset Optimization Technique (SCOOT) with splits and offsets).

Time-constrained optimization: where the optimization search process is constrained by time and/or structural boundaries based on the limits of local controllers (e.g. Real Time Hierarchical Optimized Distributed Effective System (RHODES), Optimized Policies for Adaptive Control (OPAC), etc.).

Rule-based adjustment: where simple functional relationships between parameters that describe a change of traffic conditions and resulting signal timings are used (e.g. time of day phase selection).

Traditionally, it has been generally held that domain-constrained adaptive control is the best approach for determining traffic signal timing, as it finds the optimal solution given a set of constraints, independent of the amount of time that it takes to compute the best solution. Time-constrained and rule-based adjustment type optimizations are more commonly applied in real-time and near real-time systems since it is possible to limit the optimization computation to a certain number of seconds to facilitate real-time performance. The downside of these approaches is that the optimization that is computed is not typically globally optimal.

The systems herein described enable an adaptive configuration to be implemented based "cloud" computing, and therefore have access to much more computational power that a traditional implementation where the optimization processes are executed on hardware at the intersection. As a result, the implementation herein described is free from the computational limits inherent with typical optimization methods. In other words, the systems herein described can run the sophistication of domain-constrained optimization with the real-time facility of a time-constrained model. To do so, the system can encourage users to not overly limit the domain constraints in their model, in order to minimize the amount of delay experience by the driver in traffic.

Some traditional adaptive systems update their signal timing every 5-15 minutes, which means that they are unable to change signal timings to react to individual vehicles in a network. Adaptive systems that operate on a real-time, or cycle basis are able to adjust traffic signal timing in real-time enabling a more predictive model. These predictive models are able to optimize traffic flow per vehicle, or per vehicle group of vehicles. The implementation of adaptive control performed by the grid optimization module 222 in this example is real-time and is predictive. Also, whereas some adaptive control systems utilize only historical data to determine optimal signal timings for a given time of day or day of week combination, and other systems use only current traffic conditions, the grid optimization module 222 can be configured to use a combination of these approaches, depending on the saturation of vehicles in a network, which yields a more optimal result. In addition, some adaptive systems are based on measuring the traffic queues at intersection directly and then try to minimize the overall length of the traffic queues; and other systems measure the flow through intersections and model the length of queues, with the objective of minimizing the length of the modeled queue; wherein both methods are substantially equivalent in terms of optimizing traffic flow. The grid optimization module 222 is operable to model the length of traffic queues, which can allow the use of only one camera 36 per intersection in some embodiments, vs. one camera per approach, which has the effect of reducing cost. The grid optimization module 222 is also operable to process measurements of the origin-destination (OD) (i.e. left and right turns) movements at an intersection, and the OD movements throughout a network acquired by sensors 38. The system's ability to measure ODs at intersections and at the network level thus enables a more optimized transportation network model and further reduces the need for costly, time consuming system calibrations.

The grid optimization module 222, upon performing an optimization, may then generate one or more instructions 51 to be sent to one or more corresponding LPMs 112 in the network in order to perform a predictive optimization of that network. For example, by observing traffic flow through one particular intersection 116, the grid optimization module 222 may then be able to adjust signal timing at one or more other intersections 116 downstream from that particular intersection in order to accommodate the traffic flow. It can be appreciated that the connectivity of the various LPMs 112 and the remote processing entity 120, and the continual updating of the grid model 220 enables a network wide optimization to be performed substantially in real-time.

An administrator (Admin) API 224 is also provided to enable an operations server 126 to make changes to or request information from the grid model 220, the grid optimization module 222, or both. In this example, the Admin API 224 can be accessed directly by the operations client 34 or via another Admin API 226 in the operations server 126. The operations server 126 also includes a web server 230 for hosting a web page for the customer browser 32 to interface with. The Admin API 226 and web server 230 are both connectable to a database 228 which is used to store a repository of operations data.

It has been found that three primary sources of cost can exist with adaptive signal control systems:

Communication Network: typical adaptive systems use citywide Ethernet and fibre networks. There are also some examples of cities using WiFi networks to enable adaptive control systems.

Detection Sensors: typical adaptive system use magnetic induction loops to detect the presence of vehicles waiting or passing through at an intersection stop bar. Other sensors include radar and video based systems.

Adaptive Controller: depending on the adaptive implementation, the controller is enabled by a central management system, a traffic signal controller or a third party hardware component.

The implementation of an adaptive system as shown in FIG. 5, can be based on a single camera 36, single LPM 112, and a serial dongle (e.g. to provide the communication interface 216), which is significantly lower cost than traditional induction loops, leverages existing broadband wireless networks 18 to minimize network installation costs, and uses economies of scale of the remote processing entity 120 to minimize the need for expensive controller hardware at the intersection. The average cost of an adaptive system is $65,000 per intersection according to the "Adaptive Traffic Control Systems: Domestic and Foreign State of Practice" report (onlinepubs.trb.org/onlinepubs/nchrp/nchrp_syn_403.pdf).

The configuration shown in FIG. 5 can be utilized to provide a monthly subscription based service to a municipality or other entity without the large capital costs upfront since the hardware installation process is easier and more cost effective and the remote processing entity 120 provides economies of scale to service multiple customers. All of these benefits represent a significant cost savings and thus ability to more easily upgrade a traffic system to utilize adaptive signal control.

As discussed above, an LPM 112 used to monitor an intersection 116 and control a TSC 114, can process a video signal to determine traffic flow using the analytics module 200, and send traffic flow data (e.g. one or more values representing traffic flow in a particular direction) to the remote processing entity 120 in order to perform a real-time optimization of a grid model 220 including that LPM 112. It can be appreciated that an intersection 116 typically includes multiple roads intersecting thus creating multiple flows within the same intersection 116. In order to distinguish between different flows, the video analytics module 200 or LPM API 206 can assign a flow ID 256 to each flow and associate one or more flow value 258 to each flow ID 256 as shown in FIG. 6, according to the number of algorithms used to determine a particular flow. The video analytics module 200 in this example monitors a plurality of frames of video in order to understand the movements through the intersection 116 and generates a flow value. For example, a range of values may be possible, which can be interpreted by the remote processing entity 120, such as values that range between 0 and 1. FIG. 6 illustrates an example data packet 250 that may be generated by the LPM 112, e.g. using the LPM API 206 to include the outputs of the video analytics module 200. In this example, an intersection ID 252 is added to identify the intersection 116 to which the analytics applies, and an LPM ID 254 is added to identify the LPM 112 that is communicating with the remote processing entity 120 (e.g. to distinguish multiples LPMs 112 from each other at the same intersection 116—see FIG. 2). Each flow ID 256 (e.g. 256a and 256b . . . in FIG. 6) is added to the packet and one or more corresponding values 258 (e.g. 258a and 258b respectively). The packet 250 thus generated carries a series of values and identifying information to enable the traffic API 218 to update the grid model 220 accordingly. The packet 250 may also carry sensor data, either raw sensor data or processed versions thereof. Alternatively, or in addition to augmenting video and sensor data, separate sensor data packets 250 can be used, wherein a sensor ID and sensor value for each sensor can be included along with the intersection ID 252 and LPM ID 254.

It can be appreciated that the data packet 250 shown in FIG. 6 is representative only and may differ in structure according to the protocol being used to deliver the data packet 250. As noted above, the UDP can be used to send datagrams to the remote processing entity 120, which is another host on an IP network (i.e. via the wireless network 18). The use of UDP avoids the need to set up special transmission channels or data paths by using a simple transmission model without implicit hand-shaking dialogues for providing reliability, ordering, or data integrity. The trade-off by using UDP is that a lower latency can be achieved when compared to other IP-based protocols such as TCP/IP. However, it can be appreciated that other protocols such as TCP/IP could be used, in particular for transmissions from the LPM 112 to the remote processing entity 120 that are not meant to be in real-time, e.g. for post-processing or bulk file transfers, etc.

By using a wireless network 18 to deliver the data packets 250 to the remote processing entity 120, relatively minor upgrades are required to existing hardware at an intersection. The wireless network, 18 also provides scalability and ubiquity of access, in particular when using a broadband cellular network. Therefore, despite inherent problems with wireless and cellular communication models, access to such networks is typically easy to achieve from most if not all intersections 116. In order to address such inherent problems, the LPM API 206 and traffic API 218 can be configured to implement suitable security measures to account for usual security concerns with wireless networks 18. Also, by optimizing the processing, e.g. by having much processing offloaded to the remote processing entity 120 and by using effective optimization and modeling software, any time constraint, i.e. latency issues, can also be overcome in order to derive the maximum benefit from the ease of access and convenience of using a wireless network 18 to communicate with many LPMs 112. By routing data and instructions through the remote processing entity 120 and by maintaining control over the LPMs 112, a data subscription model can be achieved that allows the remote processing entity 120 to provide the services described herein to customers on a monthly subscription basis rather than by selling expensive hardware and trying to capture ongoing costs using other models.

FIG. 7 illustrates an example instruction packet 260 that may be generated by the traffic API 218 or grid optimization module 222 in order to deliver an instruction 51 to a particular LPM 112. In this example, an intersection ID 262 is added to identify the destination intersection 116, and an LPM ID 264 is added to identify the destination LPM 112 (since multiple LPMs 112 may be deployed at the same intersection 116). An instruction 51 is then added, which instructs the LPM 112 what to ask of the TSC 114 in order to retime the traffic lights 117. An execution time 270 can also be added to impose a time by which the retiming command 268 should be executed before it may become obsolete or ineffective. For example, if processing delays or transmission delays affect the delivery of the instruction 51 to the LPM 112, the instruction 51 may arrive later than when it would have the optimal effect and thus can be discarded or otherwise ignored or bypassed.

Figure 8:
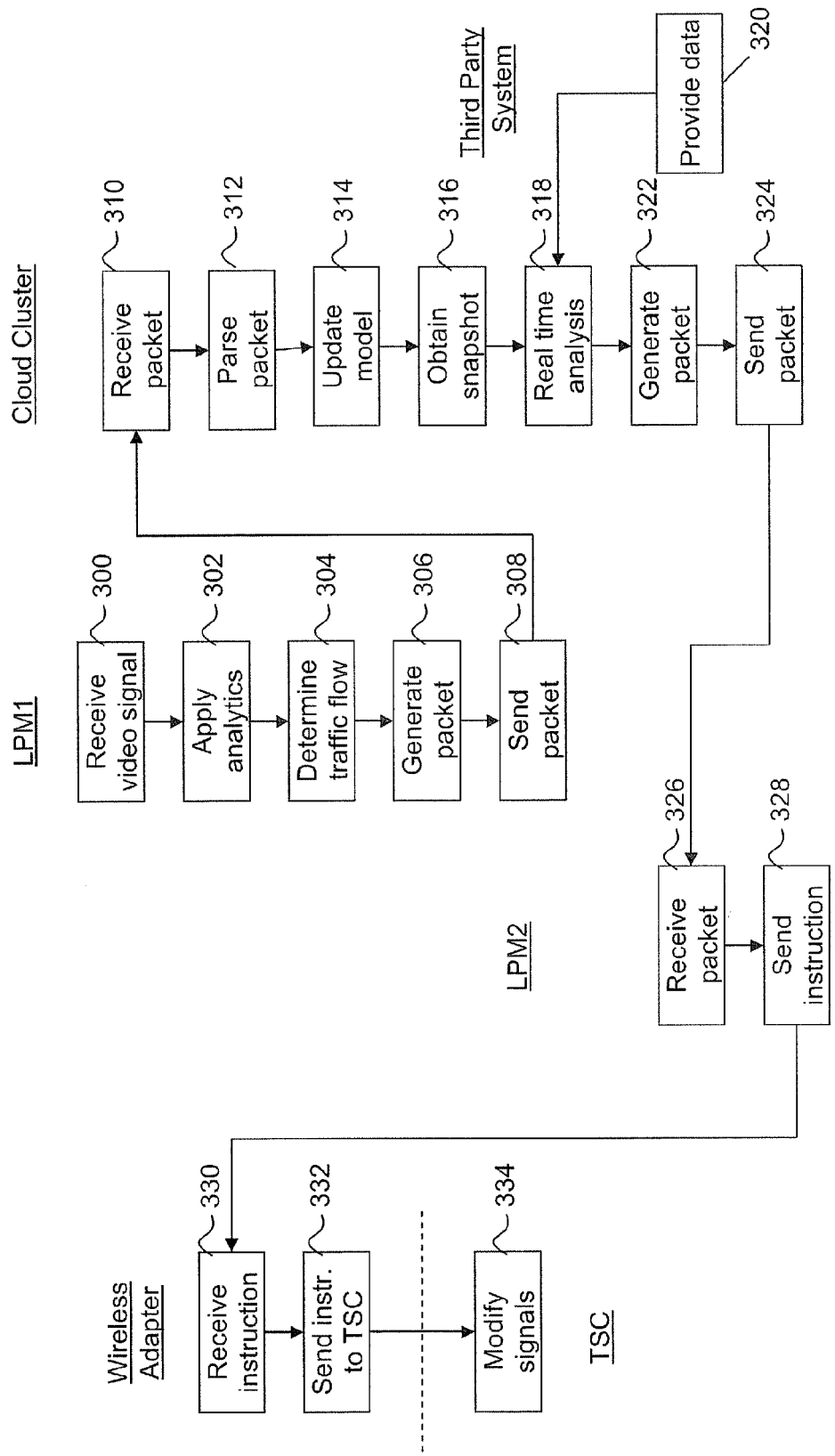
FIG. 8 is a flow diagram illustrating an example set of operations that may be executed in monitoring and controlling traffic signal timing.

FIG. 8 illustrates an example set of operations that may be performed by the configuration shown in FIG. 5 for monitoring traffic at one intersection 116 and controlling traffic signal timing at another intersection 116. It will be appreciated that although the example shown in FIG. 8 illustrates a method for signal retiming, video streaming or store and forward and sensor monitoring may also be performed in conjunction or otherwise using the same equipment as shown in FIG. 5. In this example, a first LPM 112, namely LPM1 receives a video signal at 300 from the camera 36 and applies analytics at 302, e.g. using the traffic flow routine 202 executed by the analytics module 200. The traffic flow is then determined at 304 from the output of the analytics and a packet 250 is generated at 306. The packet 250 is then sent to the remote processing entity 120 at 308, which is received thereby at 310.

The traffic API 218 obtains the packet 250 thus received by the remote processing entity 120, and parses the packet 250 to determine how to update the grid model 220 at 314. The grid optimization module 222 then obtains a snapshot of the grid model 220 at 316, and performs an optimization routine at 318 to thereby conduct a real-time analysis of the data provided by LPM1 pertaining the corresponding intersection 116. The real time analysis 318 may incorporate third party data provided by a third party system 28 at 320. A control packet 260 is then generated at 322 by identifying the intersection 116 and LPM 112 that is to be re-timed and including one or more instructions or commands to be provided to that LPM 112, in this example LPM2. The control packet 260 is sent at 324 and received by LPM2 at 326 and sent to the communication interface 216 at 328. It can be appreciated that as will be explained below, LPM2 may need to parse the control packet 260 and, if necessary translate the value provided as the command or instruction into a format that is recognized by the TSC 114. Such translation may also be performed by the communication interface 216 if the communication interface 216 has these capabilities. Translation of the instruction 51 may involve modifications required by the communication protocol used and/or modifications to the format of the actual instructions or commands being provided.

The instruction 51 or a packet 260 or message containing the instruction 51 is received by the communication interface 216 at 330, e.g. via a Bluetooth or other short-term wireless connection. It can be appreciated that the use of a short term wireless connection between the LPM 112 and the communication interface 216 minimizes the installation costs and effort required to interface with the TSC 114 which is typically an existing component at the intersection 116 that should not be modified in any substantial way. The communication interface 216 is, in this example, closely coupled to the TSC 114 and sends the instruction 51 to the TSC 114 at 332 to enable the TSC 114 to modify its traffic signals at 334. As noted above, the instruction 51 may comprise any one or more instruction, command, setting or parameter modification, replacement file, or any other software component or data structure that is capable of altering an existing signal timing scheme to generate a new one in accordance with the optimization performed in the real time analysis at 318.

Figure 9:
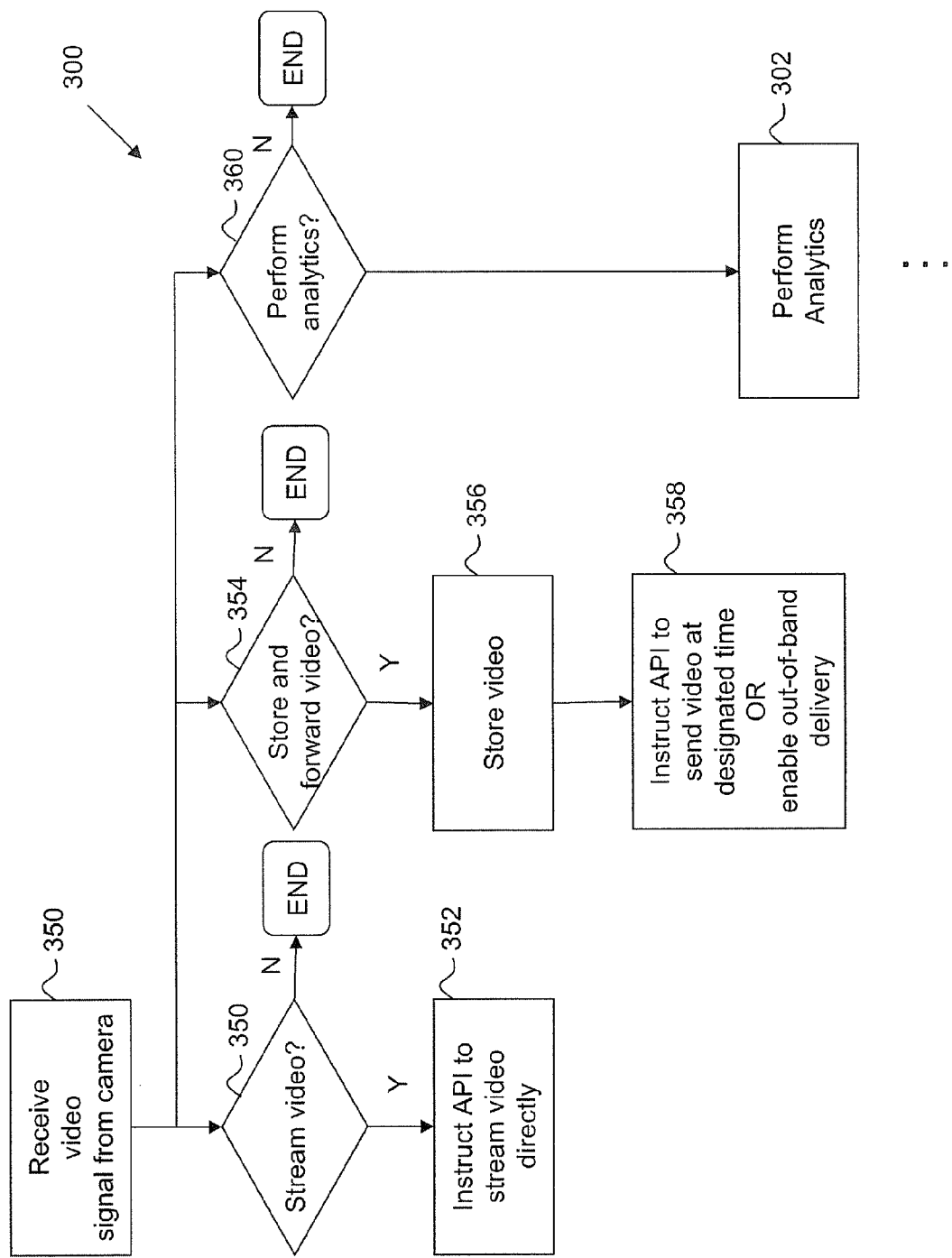
FIG. 9 is an example set of computer executable operations that may be performed by a local processing module (LPM) in handling an incoming video signal.

FIG. 9 illustrates the various ways in which the video signal may be handled upon receiving it at 300. In this example, at 350, the LPM 112 receives the video signal from the camera 36 and determines at 350 if the video is to be streamed to the remote processing entity 120. If the video is to be streamed, the video is captured by the streaming video module 208 and the LPM API 206 is instructed at 352 to stream the video directly to the remote processing entity 120, e.g. to the post-processing server 24. The LPM 112 also determines at 354 whether or not the video signal is to be stored, such that it can be forwarded at a later time for post-processing or another use. If so, the video is stored at 356 in the video data storage 210 and the LPM API 206 is instructed at 358, at a designated or predetermined time, to send the video via the wireless network 18, or the video data storage 210 is made available for an out-of-band delivery. For example, the video may be obtained by connecting directly to the LPM 112 and downloading the stored video. The LPM 112 also determines if analytics are to be performed at 360, details of which are shown in FIG. 8. If so, the analytics are performed at 302 and the process may continue as discussed above. It can be appreciated that the sensor data received from the sensors 38 can be processed by the sensor module 211 in a manner similar to that shown in FIG. 9.

Figure 10:
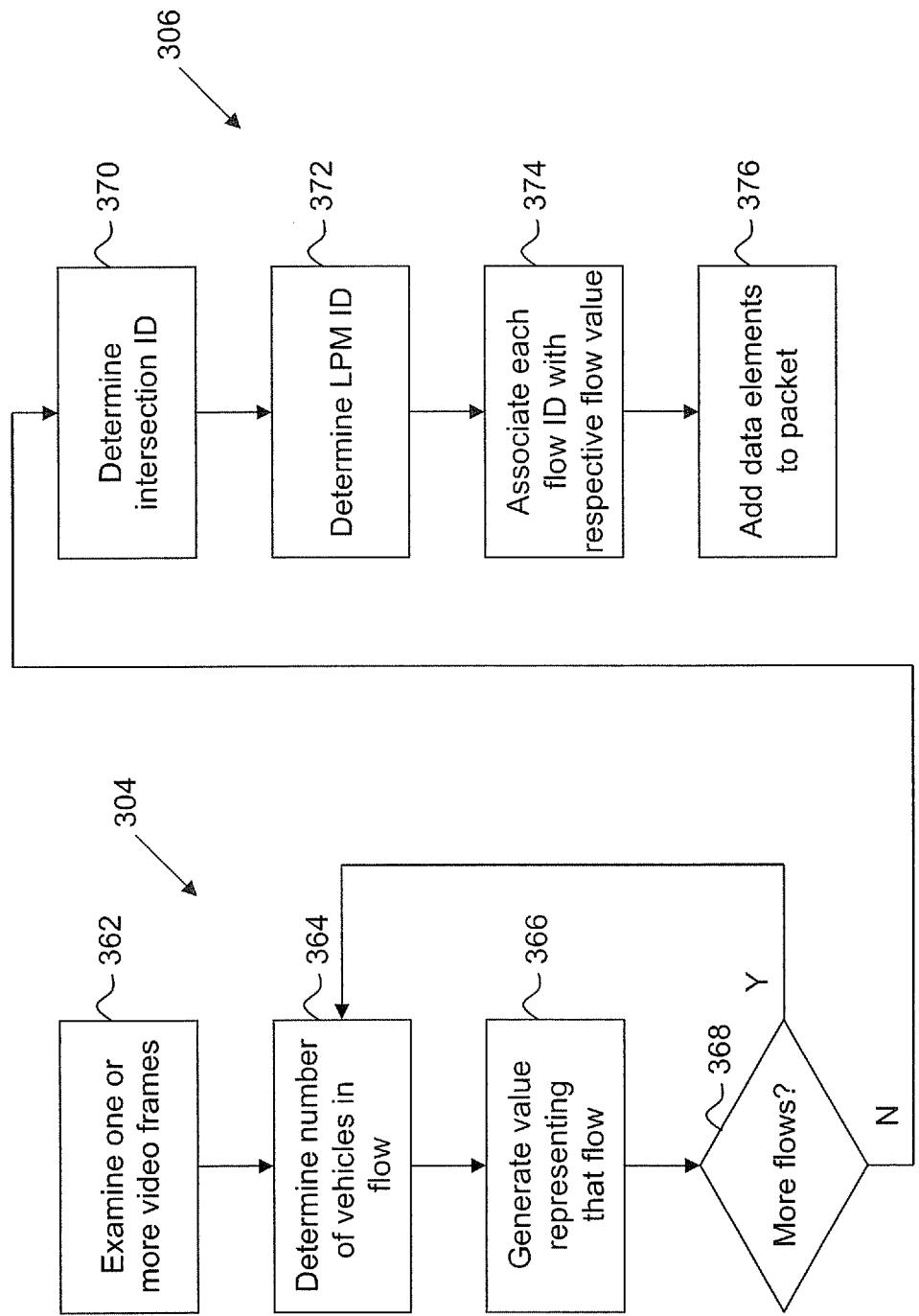
FIG. 10 is an example set of computer executable operations that may be performed by an LPM in applying analytics and generating a data packet for providing traffic flow information.

FIG. 10 illustrates example operations that may be performed at 304 and 306 shown in FIG. 8 in order to determine traffic flow and generate a data packet 250 to send to the remote processing entity 120. At 362, the traffic flow algorithm 202 examines one or more video frames and determines at 364 the number of vehicles in a particular "flow", namely a particular lane, direction or other portion of the intersection 116. A value representing that flow is then generated at 366. The traffic flow algorithm 202 then determines at 368 if more flows need to be analyzed. If so, operations 364 and 366 are repeated. If not, operation 306 generating the data packet 250 begins by determining an intersection ID 252 at 370, the LPM ID 254 at 372, and each flow ID 256 is associated a respective flow value 258. The data elements are then added to the packet at 376.

Figures 11, 12:
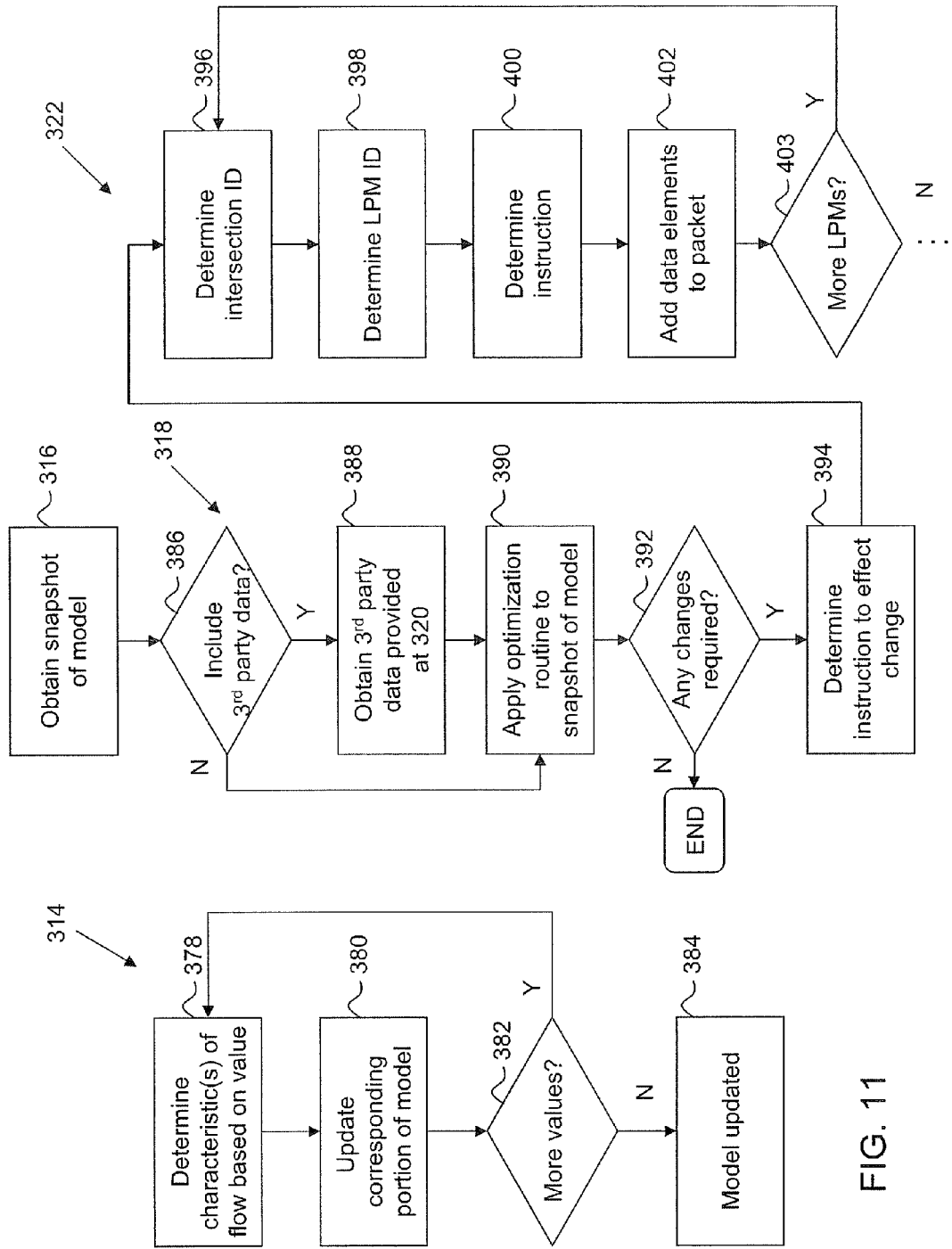
FIG. 11 is an example set of computer executable operations that may be performed by a remote processing server in updating a traffic model.
FIG. 12 is an example set of computer executable operations that may be performed by a remote processing server in performing a real-time analysis of a snapshot of a traffic model and generating a data packet for providing a traffic timing instruction.

Turning now to FIG. 11, example operations are shown that may be executed by the traffic API 218 to update the grid model 220. The traffic API 218 determines at 378 any one or more characteristics of a flow based on the corresponding values 258 in order to update the corresponding portion of the grid model 220 at 380. For example, traffic flow in one direction through an intersection in a particular direction can be reflected in the grid model 220 upon determining the meaning of the value 258 sent in the data packet 250 and assigning it to the model 220 based on the intersection ID 252. The traffic API 218 then determines at 382 if more flow values 258 are to be processed. If so, 378 and 380 are repeated. It can be appreciated that other values representing sensor data if in the same packet 250 may be processed at the same time or separate packets 250 may be processed in order to update the model 220 using both camera and sensor data if applicable. Once all values 258 in the data packet(s) 250 have been processed, the grid model 220 is thereby updated.

FIG. 12 illustrates example operations that may be performed by the real-time analysis server 122 to perform a predictive optimization and generate an instruction packet 260 to be sent to one or more LPMs 112. The grid optimization module 222 obtains a snapshot of the grid model 220 at 316 and determines at 386 if any third party data is to be incorporated into the optimization. If so, the third party data is obtained at 388. The optimization routine is then applied to the snapshot of the model at 390 and the grid optimization module 222 then determines at 392 if any changes are required. If not, the process ends. Assuming the outcome of the optimization routine suggests at least one change to signal timing at one or more intersections 116, the grid optimization module 222 or the traffic API 218 determines at 394, the instructions, commands, modifications etc. that can be used to effect the suggested change to traffic signal timing. An instruction packet 260 may then be generated by determining at 396, the intersection 116 and associated intersection ID 262 to be controlled; determining at 398, the LPM ID 264; and determining at 400, the instruction 51 to be included. The data elements are then added to the instruction packet 260 at 402. The grid optimization module 222 or traffic API 218 then determines at 403 whether or not additional LPMs 112 are affected by the optimization that was performed and if so repeats 396 to 402 for each LPM 112 including respective instructions 51. It can be appreciated that the instructions 51 sent to different LPMs 112 may be and often are different from each other as each intersection 116 may be different and need to be controlled in a different way depending on what feeds into and out of it.

Figure 13:
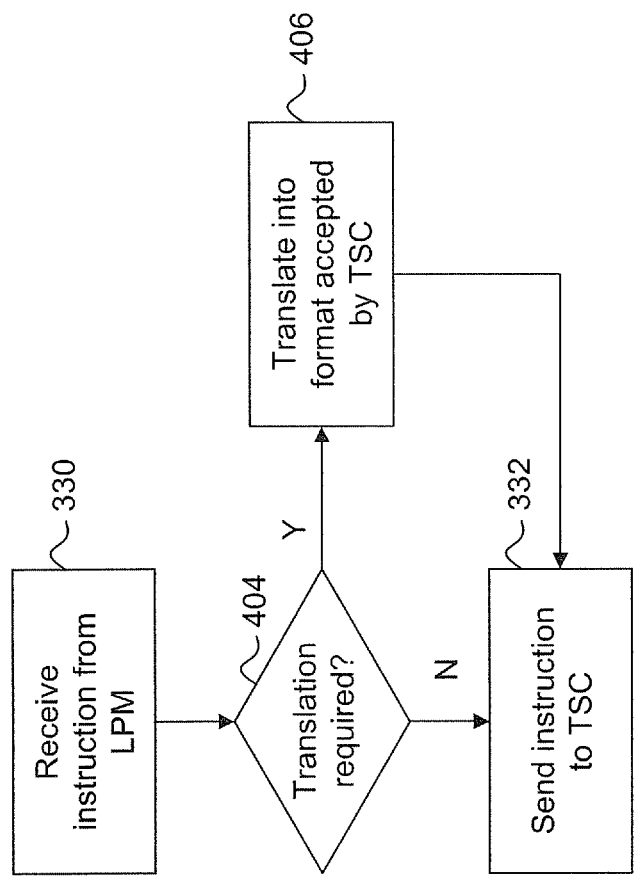
FIG. 13 is an example set of computer executable operations that may be performed by a communication interface in processing an incoming data packet comprising a traffic timing instruction.

FIG. 13 illustrates example operations that may be performed by the communication interface 216 in order to ensure that the TSC 114 can be programmed, modified, controlled or otherwise instructed to re-time its signals according to what was determined from the optimization performed. It can be appreciated that the operations shown in FIG. 13 may instead be performed by the LPM API 206 or any other component that is configured to determined whether or not the instruction 51 in the instruction packet 260 is of a suitable format for the TSC 114. In this example, the communication interface receives the instruction 51 (or instruction packet 260 entirely) at 330 and determines at 404 if the instruction 51 needs to be translated or otherwise converted to a format accepted by the TSC 114. If not, the instruction 51 is sent or otherwise provided to or imposed upon the TSC 114 at 332. If translation is required, the instruction 51 is formatted or otherwise modified to be of an appropriate format before being sent to the TSC 114 at 332. It can be appreciated that with most if not all communication protocols, some form of translation is likely required in order to provide the TSC 114 with the appropriate data or instruction and thus the determination at 404 may not be required, e.g. if translation is always needed.

Figure 14:
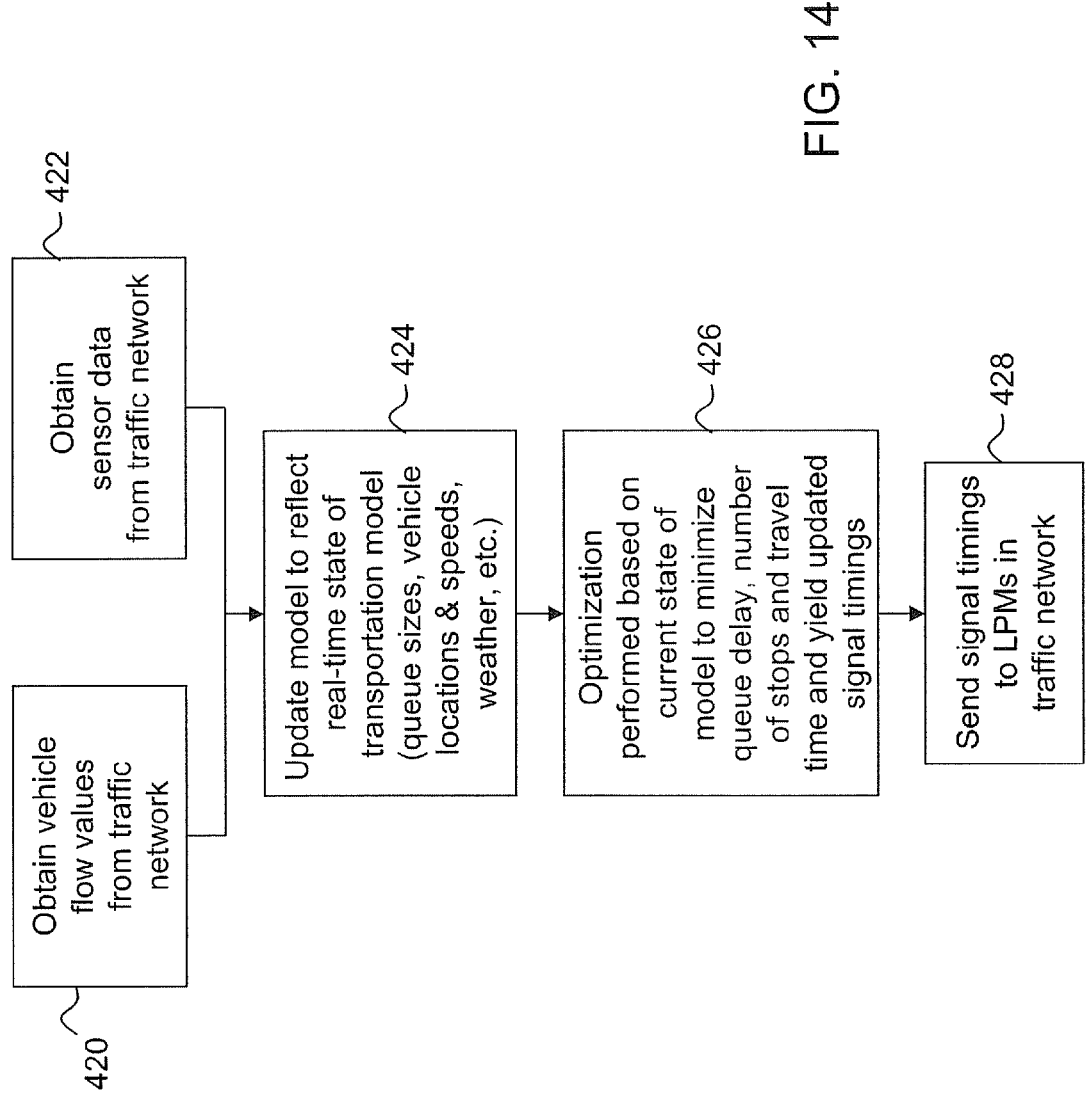
FIG. 14 is an example set of computer executable operations that may be performed in optimizing signal timing.

FIG. 14 illustrates an example set of operations that may be executed by the real-time processing server 122 in performing an optimization of a snapshot of the grid model 220. At 420, the vehicle flow values are obtained from the traffic network, i.e. collected from the LPMs 112 in the traffic network. At 422, the sensor data that has been acquired by the various sensors 38 in the traffic network, and, which is to be augmented with traffic flow data, is obtained from the LPMs 112. The grid model 220 is then updated at 424 to reflect the real-time state of the transportation model represented by the grid model 220. In this example, the data obtained is used to determine queue sizes, vehicle locations and speeds, weather, other environmental factors, etc. The optimization is then performed at 426 based on the current state of the grid model 220 (i.e. its snapshot) to minimize queue delay, the number of stops and travel time and thus yield updated signal timing. The updated signal timings are then sent to the LPMs 112 in the traffic network at 428.

The hardware used at the intersection 116 can be implemented using temporary or permanent hardware set ups as will now be described making reference to FIGS. 15 and 16.

Figure 15:
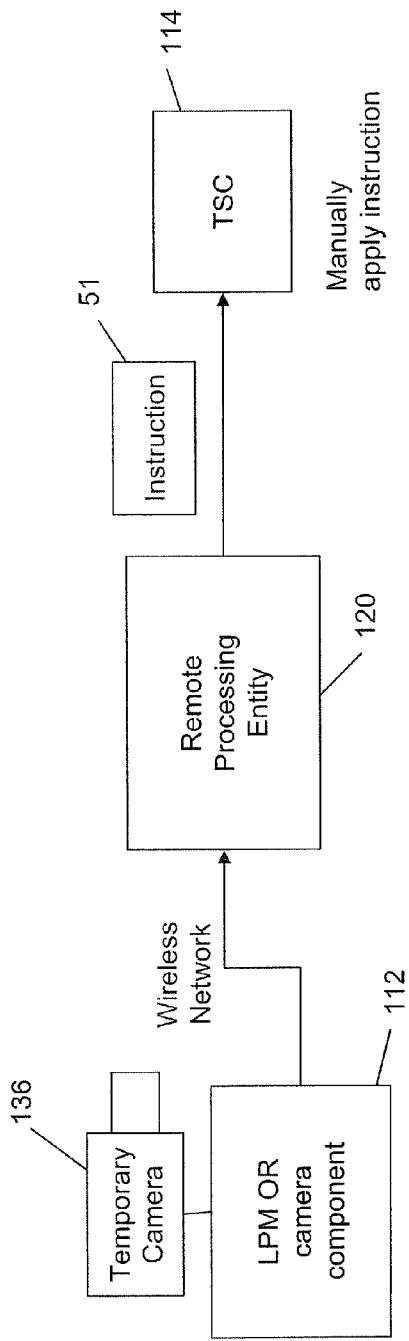
FIG. 15 is a block diagram illustrating a temporary hardware setup.

The configuration shown in FIG. 15 includes a temporary camera 136 situated at the intersection 116 which can record video of traffic flow at the intersection. The camera 136 records video and can feed that video and other additional data through the wireless network 18, either itself (camera component) or an LPM 112, to the remote processing entity 120. The remote processing entity 120 in such a configuration then initiates processing of the video to collect traffic data (vehicle classes, volumes and movements) at the intersection. In other words, in the temporary set-up shown in FIG. 15, the remote processing entity 120 performs all processing, including the analytics performed at the LPM 112 as shown in FIG. 5. Once data is returned the remote processing entity 120 initiates an analysis of the data (uses signal delay modeling methodologies and linear optimization) to propose an optimal signal timing for that particular traffic signal. It should be noted that described solution can also work with multiple intersections (more than 1) to optimize a network or corridor of traffic signals.

Once the analysis is completed a traffic engineer reviews the results from a web application and signs off on the proposed changes. Or they can modify the delay model methodology or change the inputs to the linear optimization problem to come up with alternative solutions. Once an appropriate solution is found the traffic engineer must manually program the signal controller 114 through a laptop/other interface. The signal controller 114 is programmed using the proposed changes identified by the analysis and approved by the traffic engineer.

Figure 16:
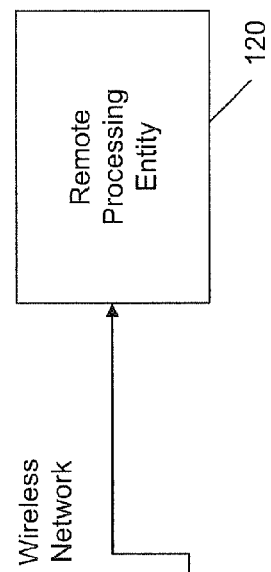
FIG. 16 is a block diagram illustrating a permanent hardware setup.
Figure 16:
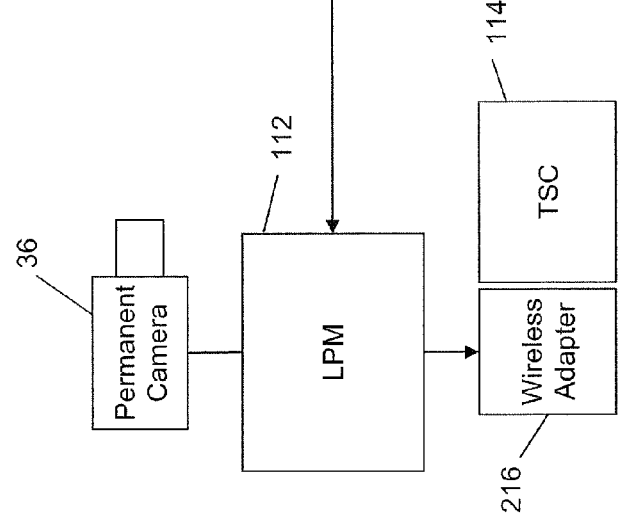

The configuration shown in FIG. 16 includes a permanent camera 36 and analysis system hardware (i.e. LPM 112) located in communication with a traffic cabinet housing the TSC 114 as described above. The LPM 112 has an interface to the camera 36 (to record video) and the TSC 114 (to read from and to write to program changes to the signal timing) and to the wireless network 18 (to send/receive video and data to the remote processing entity) as discussed above. When compared to FIG. 15, it can be seen that the configuration shown in greater detail in FIG. 5 enables a permanent or semi-permanent installation to collect data over a relatively long period of time and to perform a real-time analysis and control, whereas the temporary set-up shown in FIG. 15 allows the optimization processing performed by the remote processing entity 120 to be utilized in a temporary fashion. It can be appreciated that the LPM 112 may not be needed in such situations, in particular if the temporary camera 136 is capable of accessing the wireless network 18 or is connected to a computing device at the intersection 116 that itself is capable of communicating via the wireless network 18.

Signal-timing projects are usually completed by public sector transportation agencies using the following methodology:
  project need is identified by a public sector transportation agency;
  project is put out for tender to a private engineering firm;
  private engineering firm subs the counting portion of the project to a third party;
  engineering firm completes the simulation model and submits report to public agency; and
  public agency creates controller timing file and programs controller in the field.

Such a process often takes a relatively long time to complete and can be expensive to implement.

Currently, a traffic engineer contracts someone to collect the data and, once this is done, they contract someone to do the modeling and analysis. Finally, the traffic engineer contracts someone to reprogram the controller or they may do this themselves.

The traffic engineer can likely find a company that will do all the above steps for them. However, that is an expensive option and the company who is completing the signal retiming project still would need to manually record the data, port the data into the analysis tool, and then reprogram the signals. The system described herein provides an underlying framework and solution that can perform all the aforementioned steps in a cost-effective manner by removing time consuming and costly manual operations.

Figure 17:
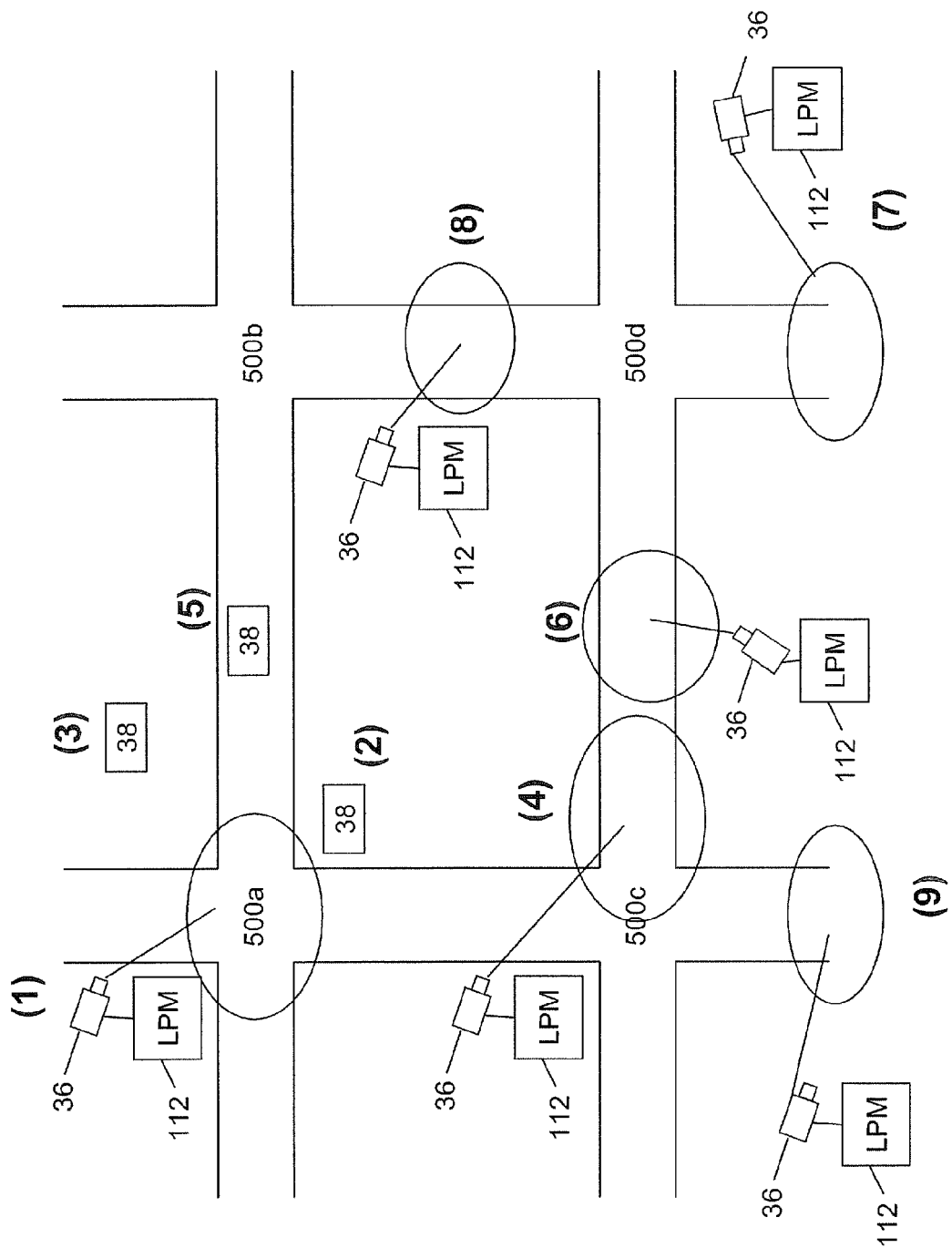
FIG. 17 is a pictorial illustration of an example set of measurements that contribute to a snapshot of a traffic model.

By incorporating the system shown in FIG. 15 or FIG. 16 a public sector transportation agency can continuously record traffic data and optimize the traffic signals within their transportation network. This service can be provided to a public sector transportation on a monthly subscription based model. A subscription based model is more cost effective than the current model which requires expensive hardware at the intersection and large upfront capital costs Turning now to FIGS. 17 and 18, an example traffic network is illustrated comprising four intersections 500, namely 500a, 500b, 500c, and 500d. By situating at least one LPM 112 and at least one camera 36 at various intersections 500, and including various sensors and/or obtaining third party data, various measurements can be made in order to model the intersection, such that a snapshot can be obtained for performing a traffic signal re-timing optimization. In this example, at intersection 500a the LPM 112 monitors flow through the intersection 116 at (1), a Bluetooth sensor 38 monitors flow through the traffic network at (2), and various sensors 38 monitor environmental conditions such as temperature, humidity, fog, etc. at (3). It can be appreciated that the various data obtained by the sensors 38 can be useful to capture a more complete picture of conditions at the intersection 114. Such conditions can be reported to various third party systems 28, or used in analyses conducted by the remote processing entity 120. It can also be appreciated that other sensors 38 can be used, for example at (2), to determine traffic volume, sensors 38 such as lidar, radar, ground loops, etc. Meanwhile an LPM 112 at intersection 500c can monitor the length of a queue at its intersection at (4). GPS data, i.e. from a third party system 28 is provided at (5), which is responsible for tasks such as monitoring the position of a bus or emergency vehicle midway between intersections 500a and 500b, and a camera 36 captures pedestrian crossing information midblock between intersections 500c and 500d at (6). At intersection 500d, vehicle volumes entering that intersection from a highway on-ramp are captured at (7) and midway between intersection 500b and 500d, midblock vehicle volumes are captured at (8). Vehicle outflows from the traffic network can also be modeled at intersection 500c at (9). By enabling all LPMs 112 to communicate over the wireless network 18 with the remote processing entity 120, a model can be built from measurements taken such as shown in FIG. 17, and the model can be continually updated using the various sensors 38 and cameras 36 and other third party data (if applicable).

Figure 18:
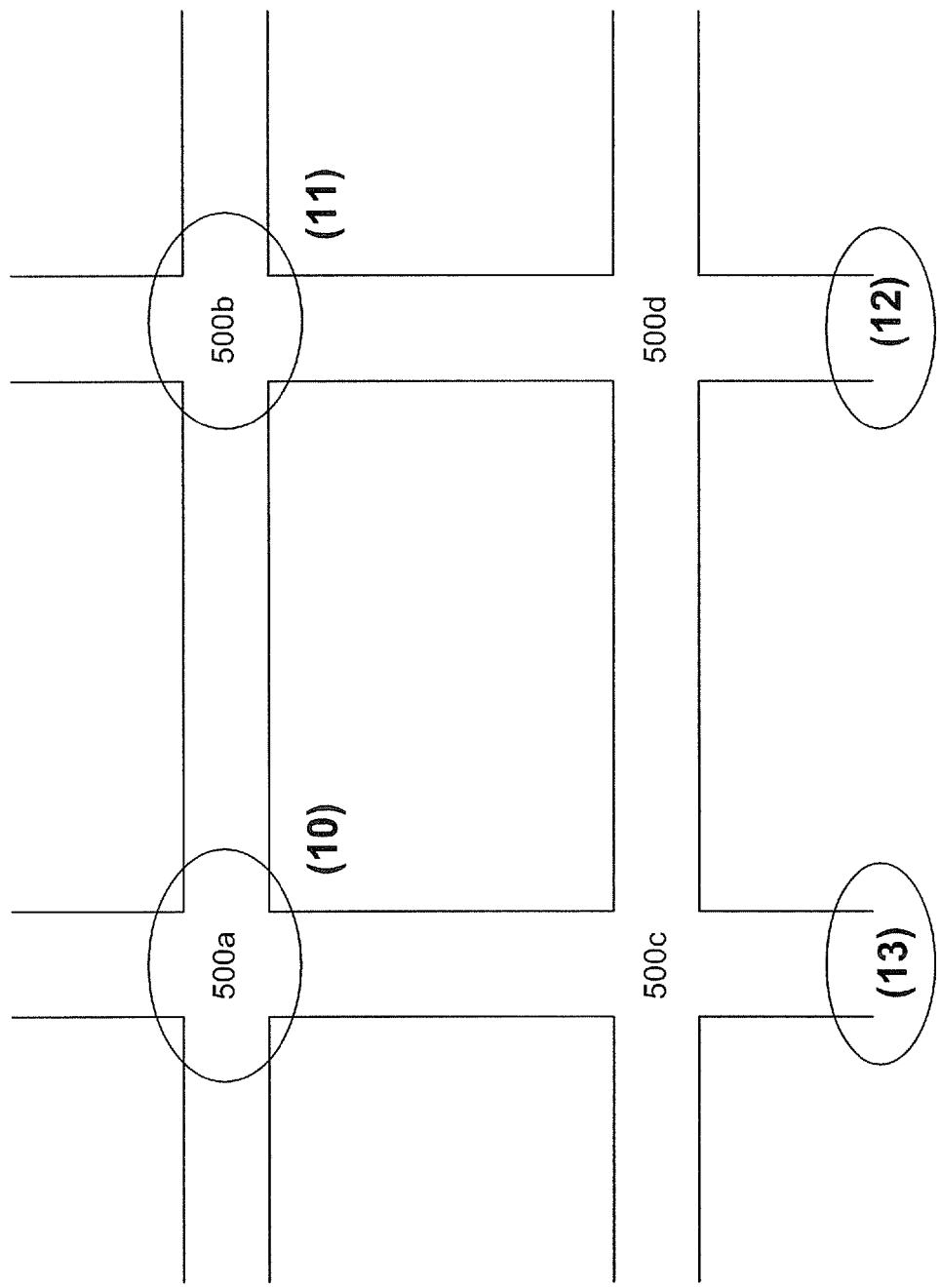
FIG. 18 is a pictorial illustration of portions of the snapshot of the traffic model of FIG. 19 to be optimized.

As shown in FIG. 18, the network of intersections 500 can be modeled in order to perform the optimization algorithm. In this example, the queue length at intersection 500a can be modeled at (10) to try to minimize wait times in such queues, the intersection 500b can be modeled at (11) based on the time of day and day of week using historical data, the inflow of traffic into the network can be modeled at (12) at intersection 500d based on the time of day (e.g. from data obtained at (7) in FIG. 17), and the outflow from the network modeled at (13) at intersection 500c based on the time of day (e.g. from data obtained at (9) in FIG. 17). In other words, FIG. 17 provides a view of the intersections as they are measured, i.e. the measurements that would be taken and where the measurements come from. FIG. 18 provides a view of the intersection as it would be modeled, i.e. the "optimization model". Measurements such as those illustrated in FIG. 17 would be plugged into the grid model 220 as shown in FIG. 18 and then the grid model 220 would optimize according to the operations shown in FIG. 14. It can be appreciated that the optimizations shown in FIG. 18 are illustrative only and may include additional optimizations, e.g. by modeling the intersections 500c and 500d themselves.

Figures 19, 20:
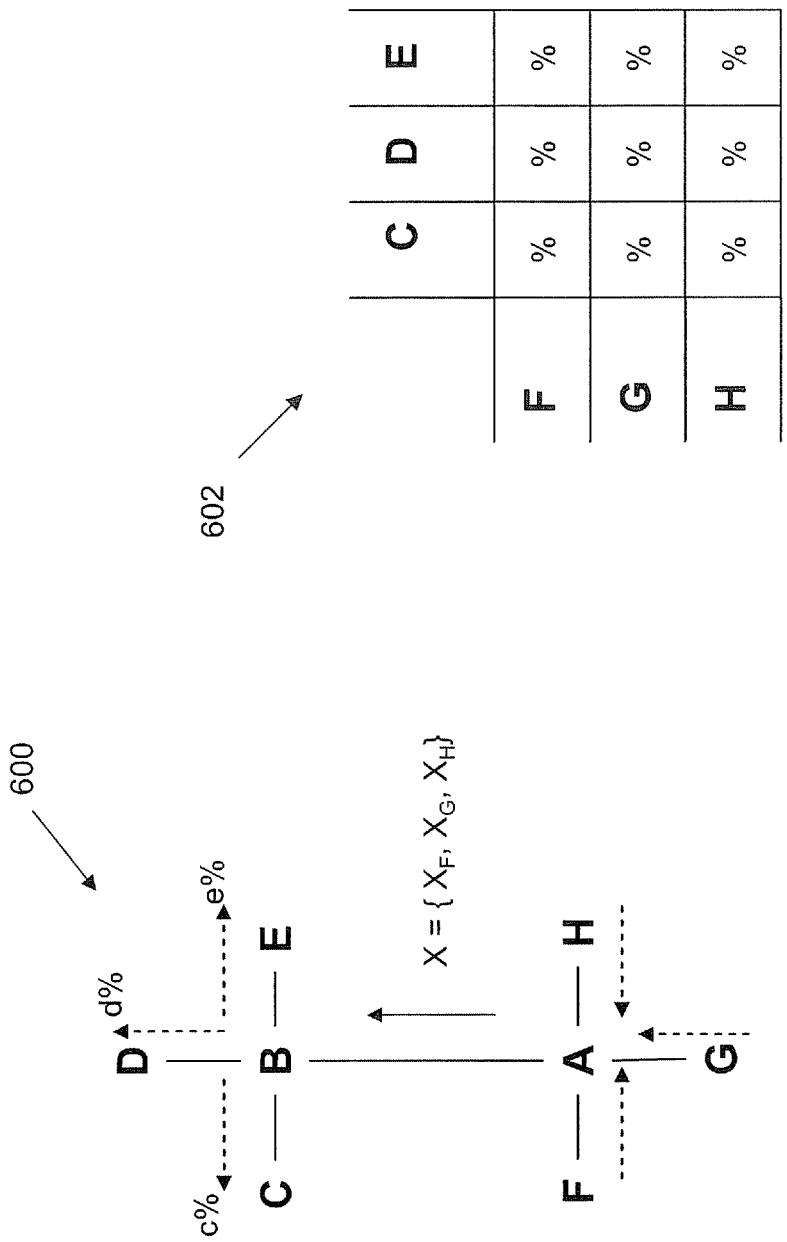
FIG. 19 is a schematic diagram of a pair of intersections illustrating origin-direction (OD) modeling based on data acquired at the intersections.
FIG. 20 illustrates an example matrix of percentages to be used in modeling OD movements through intersections.

As discussed above, the grid model 220 can be built and updated using not only traffic flow values obtained from video feeds, but also based on historical and real-time data obtained from the sensors 38. As such, both camera data and sensor data can be augmented to further enhance the optimization of the traffic network for determining appropriate signal re-timings. Turning to FIG. 19, an example schematic diagram 600 of a pair of intersections, A, B is shown. It can be seen in FIG. 19 that in this example, vehicle flow or volume X travelling from A to B is accumulated from vehicle flow through intersection A from F, G, or H. As such, the volume X may be modeled as a set of three components, namely $\{X_F, X_G, X_H\}$. The turning patterns for at least some vehicles can be determined using sensors such as the Bluetooth sensor 38 at (2) in FIG. 17. By detecting Bluetooth transceivers in vehicles over time, the typical patterns of traffic can be modeled. For example, there may be a historical percentage of vehicles that turn into A from F and a different percentage that turn into A from G, and yet another percentage turning from H into A. Either from real-time sensor data 38 or historical averages, a particular volume X can be estimated to have proportions that originated from F, G, or H.

When arriving at B, based on historical data, the likelihood that particular portions of the volume X will turn towards C, D, or E, can also be relied on in order to estimate how the volume X will likely disperse when entering B. The historical data can again be obtained from sensors 38 such as Bluetooth sensors at the intersection B. In addition to historical data, other data such as third party data can also affect the percentages. For example, an emergency vehicle down stream that is likely approaching B may affect the paths vehicles will take when approaching B.

The origins of the vehicles in volume X may also affect the likelihood of entering C, D, or E when approaching B. For example, vehicles that came from H may be less likely to turn towards E as they would towards C or D. As such, the origin of a particular vehicle can affect the likelihood of it having a particular destination. Using historical and real-time data, matrices of percentages 602 can be built as shown in FIG. 20. A corresponding matrix 602 may then be referenced to estimate the destination based on the vehicle's origin, according to the direction of travel. In the example of FIGS. 19 and 20, a matrix 602 corresponding to vehicles going from A to B is shown. From this matrix, one can determine that vehicle travelling from A to B and coming from H have a certain percentage likelihood that, for example, that vehicle will turn towards C. This may be done by finding the row labelled with the origin (e.g. "H" in the above example) and determining from that row, percentages for the available destinations (e.g. "H-C" in the above example).

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the LPM 12, controlled system 14, remote processing entity 20, third party system 28, operations client 34, customer browser 32, etc. or accessible or connectable thereto. Any application or module herein described may be implemented using computer readable/ executable instructions that may be stored or otherwise held by such computer readable media.

Although the above has been described with reference to certain specific embodiments, various modifications thereof will be apparent to those skilled in the art without departing from the scope of the claims appended hereto.

The invention claimed is:

1. A method of modeling and optimizing a transportation network, the method comprising:
   receiving from a first processing module, via a wireless network, at least one value indicative of a corresponding traffic flow through a first intersection, the at least one value having been obtained by processing data from a video signal from a camera at the first intersection;
   using the at least one value to update a model of the transportation network, the model being continually updated as data is received from a plurality of sources in the transportation network, the transportation network comprising the first intersection and at least a second intersection;
   obtaining a representation of a current state of the model and performing a predictive optimization of the current state of the model to determine an instruction for predictively optimizing a controller at the second intersection; and
   sending the instruction to a second processing module at the second intersection via the wireless network, to enable the second processing module to have the instruction implemented by the controller at the second intersection to optimize at least a portion of the transportation network.

2. The method according to claim 1, wherein the obtaining the representation comprises obtaining a snapshot of the model and applying one or more optimization algorithms to the snapshot of the model to determine the instruction.

3. The method according to claim 1, further comprising obtaining third party data from a third party system; and updating the model using the third party data.

4. The method according to claim 1, further comprising receiving the video signal or data derived therefrom from the first processing module, and applying one or more post-processing algorithms.

5. The method according to claim 1, further comprising receiving from the first processing module, via the wireless network, sensor data having been acquired at or near the first intersection, and using the sensor data in one or more of updating the model and analyzing the model.

6. The method according to claim 5, wherein the received sensor data comprises origin-destination information, the method further comprising including the origin-destination information in one or more of updating the model and analyzing the model.

7. The method according to claim 1, further comprising providing the model or data derived therefrom to a third party.

8. A method of modeling and optimizing a transportation network, the method comprising:
   obtaining a video signal from a camera at a first intersection;
   processing data from the video signal to determine at least one value indicative of a corresponding traffic flow through the first intersection;
   sending the at least one value to a remote processing entity via a wireless network to enable the remote processing entity to update a model of the transportation network, the model being continually updated by the remote processing entity as data is received from a plurality of sources in the transportation network, the transportation network comprising the first intersection and at least a second intersection;
   receiving from the remote processing entity, an instruction for a controller at the first intersection, the instruction having been determined from a representation of a current state of the model based on data from at least the second intersection and a predictive optimization performed using the current state of the model; and
   having the instruction implemented by the controller at the first intersection to predictively optimize at least a portion of the transportation network.

9. The method according to claim 8, wherein having the instruction implemented comprises sending the instruction to a communications interface coupled to the controller.

10. The method according to claim 9, wherein the instruction is sent to the communications interface via a short-range wireless connection.

11. The method according to claim 8, further comprising sending the video signal or data derived therefrom to the remote processing entity to have one or more post-processing algorithms applied.

12. The method according to claim 8, further comprising sending, via the wireless network, sensor data having been acquired at or near the first intersection to enable the sensor data to be used in one or more of updating the model and analyzing the model.

13. A method of modeling and optimizing a transportation network, the method comprising:
   receiving an instruction from a remote processing entity via a wireless network, the instruction for having a controller predictively optimize at least a portion of the transportation network at a first intersection, the instruction having been determined by the remote processing entity obtaining a representation of a current state of a model of the transportation network comprising the first intersection and performing a predictive optimization of the current state of the model, the model having been continually updated as data is received from one or more additional intersections in the transportation network; and
   sending the instruction to a communications interface coupled to the traffic signal controller.

14. The method according to claim 13, wherein the instruction is sent to the communication interface via a short-range wireless connection.

15. A non-transitory computer readable medium comprising computer executable instructions for modeling and optimizing a transportation network, the computer executable instructions comprising instructions for:
   receiving from a first processing module, via a wireless network, at least one value indicative of a corresponding traffic flow through a first intersection, the at least one value having been obtained by processing data from a video signal from a camera at the first intersection;
   using the at least one value to update a model of the transportation network, the model being continually updated as data is received from a plurality of sources in the transportation network, the transportation network comprising the first intersection and at least a second intersection;
   obtaining a representation of a current state of the model and performing a predictive optimization of the current state of the model to determine an instruction for predictively optimizing a controller at the second intersection; and sending the instruction to a second processing module at the second intersection via the wireless network, to enable the second processing module to have the instruction implemented by the controller at the second intersection to optimize at least a portion of the transportation network.

16. A non-transitory computer readable medium comprising computer executable instructions for modeling and optimizing a transportation network, the computer executable instructions comprising instructions for:
obtaining a video signal from a camera at a first intersection;
processing data from the video signal to determine at least one value indicative of a corresponding traffic flow through the first intersection;
sending the at least one value to a remote processing entity via a wireless network to enable the remote processing entity to update a model of the transportation network, the model being continually updated by the remote processing entity as data is received from a plurality of sources in the transportation network, the transportation network comprising the first intersection and at least a second intersection;
receiving from the remote processing entity, an instruction for a controller at the first intersection, the instruction having been determined from a representation of a current state of the model based on data from at least the second intersection and a predictive optimization performed using the current state of the model; and
having the instruction implemented by the controller at the first intersection to predictively optimize at least a portion of the transportation network.

17. A non-transitory computer readable medium comprising computer executable instructions for modeling and optimizing a transportation network, the computer executable instructions comprising instructions for:
receiving an instruction from a remote processing entity via a wireless network, the instruction for having a controller predictively optimize at least a portion of the transportation network at a first intersection, the instruction having been determined by the remote processing entity obtaining a representation of a current state of a model of the transportation network comprising the first intersection and performing a predictive optimization of the current state of the model, the model having been continually updated as data is received from one or more additional intersections in the transportation network; and
sending the instruction to a communications interface coupled to the traffic signal controller.

18. A system comprising a processor and memory, the memory comprising computer executable instructions for:
receiving from a first processing module, via a wireless network, at least one value indicative of a corresponding traffic flow through a first intersection, the at least one value having been obtained by processing data from a video signal from a camera at the first intersection;
using the at least one value to update a model of the transportation network, the model being continually updated as data is received from a plurality of sources in the transportation network, the transportation network comprising the first intersection and at least a second intersection;
obtaining a representation of a current state of the model and performing a predictive optimization of the current state of the model to determine an instruction for predictively optimizing a controller at the second intersection; and
sending the instruction to a second processing module at the second intersection via the wireless network, to enable the second processing module to have the instruction implemented by the controller at the second intersection to optimize at least a portion of the transportation network.

19. The system according to claim 18, wherein the obtaining the representation comprises obtaining a snapshot of the model and applying one or more optimization algorithms to the snapshot of the model to determine the instruction.

20. The system according to claim 18, further comprising instructions for obtaining third party data from a third party system; and updating the model using the third party data.

21. The system according to claim 18, further comprising instructions for receiving the video signal or data derived therefrom from the first processing module, and applying one or more post-processing algorithms.

22. The system according to claim 18, further comprising instructions for receiving from the first processing module, via the wireless network, sensor data having been acquired at or near the first intersection, and using the sensor data in one or more of updating the model and analyzing the model.

23. The system according to claim 22, wherein the received sensor data comprises origin-destination information, the method further comprising including the origin-destination information in one or more of updating the model and analyzing the model.

24. The system according to claim 18, further comprising instructions for providing the model or data derived therefrom to a third party.

25. A system comprising a processor and memory, the memory comprising computer executable instructions for:
obtaining a video signal from a camera at a first intersection;
processing data from the video signal to determine at least one value indicative of a corresponding traffic flow through the first intersection;
sending the at least one value to a remote processing entity via a wireless network to enable the remote processing entity to update a model of the transportation network, the model being continually updated by the remote processing entity as data is received from a plurality of sources in the transportation network, the transportation network comprising the first intersection and at least a second intersection;
receiving from the remote processing entity, an instruction for a controller at the first intersection, the instruction having been determined from a representation of a current state of the model based on data from at least the second intersection and a predictive optimization performed using the current state of the model; and
having the instruction implemented by the controller at the first intersection to predictively optimize at least a portion of the transportation network.

26. The system according to claim 25, wherein having the instruction implemented comprises sending the instruction to a communications interface coupled to the controller.

27. The system according to claim 26, wherein the instruction is sent to the communications interface via a short-range wireless connection.

28. The system according to claim 25, further comprising instructions for sending the video signal or data derived therefrom to the remote processing entity to have one or more post-processing algorithms applied.

29. The system according to claim 25, further comprising instructions for sending, via the wireless network, sensor data having been acquired at or near the first intersection to enable the sensor data to be used in one or more of updating the model and analyzing the model.

30. A system comprising a processor and memory, the memory comprising computer executable instructions for:
   receiving an instruction from a remote processing entity via a wireless network, the instruction for having a controller predictively optimize at least a portion of the transportation network at a first intersection, the instruction having been determined by the remote processing entity obtaining a representation of a current state of a model of the transportation network comprising the first intersection and performing a predictive optimization of the current state of the model, the model having been continually updated as data is received from one or more additional intersections in the transportation network; and
   sending the instruction to a communications interface coupled to the traffic signal controller.

31. The system according to claim 30, wherein the instruction is sent to the communication interface via a short-range wireless connection.

* * * * *